US008164595B2

(12) United States Patent
Yabuki et al.

(10) Patent No.: US 8,164,595 B2
(45) Date of Patent: Apr. 24, 2012

(54) COMPUTER-READABLE STORAGE MEDIUM HAVING DISTRIBUTION CHART DISPLAY PROGRAM STORED THEREIN, INFORMATION PROCESSING APPARATUS, AND DISTRIBUTION CHART DISPLAY SYSTEM

(75) Inventors: Kosuke Yabuki, Kyoto (JP); Tokihiko Toyoda, Kyoto (JP); Tetsuya Nakata, Kyoto (JP); Yusuke Shiraiwa, Kyoto (JP); Shigetoshi Kitayama, Kyoto (JP); Jun Ito, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1130 days.

(21) Appl. No.: 12/010,032

(22) Filed: Jan. 18, 2008

(65) Prior Publication Data

US 2009/0102847 A1 Apr. 23, 2009

(30) Foreign Application Priority Data

Oct. 23, 2007 (JP) ................................. 2007-274866

(51) Int. Cl.
*G06T 11/20* (2006.01)
(52) U.S. Cl. ........................ 345/440; 715/700
(58) Field of Classification Search ................... 345/440
See application file for complete search history.

(56) References Cited

U.S. PATENT DOCUMENTS

| 6,144,379 A * | 11/2000 | Bertram et al. ............... 715/835 |
| 6,672,961 B1 * | 1/2004 | Uzun .............................. 463/31 |
| 7,497,776 B1 * | 3/2009 | Roman ............................. 463/6 |
| 2004/0002369 A1 * | 1/2004 | Walker et al. ..................... 463/1 |
| 2008/0113805 A1 * | 5/2008 | David et al. ..................... 463/42 |

FOREIGN PATENT DOCUMENTS

| EP | 1371403 A2 * | 12/2003 |
| EP | 1475134 A2 * | 11/2004 |
| EP | 1810732 A2 * | 7/2007 |
| JP | 2005-118543 | 5/2005 |

OTHER PUBLICATIONS

Mathworks, "Interpolation, chapter3", Dec. 26, 2005. (http://www.mathworks.com/moler/interp.pdf).*

* cited by examiner

*Primary Examiner* — Michelle L Sams
(74) *Attorney, Agent, or Firm* — Nixon & Vanderhye P.C.

(57) ABSTRACT

A distribution chart representing a distribution of accomplishment times included in a plurality of pieces of result data is generated based on the plurality of pieces of result data including the accomplishment times of a racing game. Icons for identifying the plurality of pieces of result data are displayed on the distribution chart. When one of the icons displayed on the distribution chart is selected by a user, a process associated with the result data represented by the one of the icons having been selected is executed. Therefore, the distribution chart which includes a plurality of pieces of data as elements and is based on a predetermined index is displayed, and an interactive operation using the distribution chart can be realized.

46 Claims, 23 Drawing Sheets

Op  
PLAYER OBJECT

Og  
GHOST OBJECT

FIG. 12

| RESULT DATA | |
|---|---|
| NAME OF USER | ICHIRO |
| USER ICON ID | 13121488 |
| RESIDENCE AREA | JAPAN |
| COURSE NUMBER | 02 |
| CHARACTER NUMBER | 01 |
| MACHINE TYPE | STANDARD TYPE |
| ACCOMPLISHMENT TIME | 5:45:288 (MINUTES:SECONDS:MICROSECONDS) |

FIG. 13

| GHOST DATA | |
|---|---|
| NAME OF USER | ICHIRO |
| USER ICON ID | 13121488 |
| RESIDENCE AREA | JAPAN |
| COURSE NUMBER | 02 |
| CHARACTER NUMBER | 01 |
| MACHINE TYPE | STANDARD TYPE |
| PLAY DATA | ・・・・・・ |
| ACCOMPLISHMENT TIME | 5:45:288 (MINUTES:SECONDS:MICROSECONDS) |
| PLAY DATE AND TIME | JULY 31, 2007 6:05 PM |

FIG. 14

| PLAY DATA ||
|---|---|
| ELAPSED TIME (MINUTES:SECONDS:MICROSECONDS) | INPUT KEY TYPE |
| 0:0:000 | A & ↑ |
| 0:0:354 | A |
| 0:1:002 | A & ← |
| ⋮ | ⋮ |
| 4:51:568 | A |

FIG. 15

| RESULT DATA DATABASE |
|---|
| RESULT DATA OF EACH USER |
| WORLD CHAMPION RESULT DATA |
| RESPECTIVE LOCAL CHAMPION RESULT DATA |
| EVENT RESULT DATA |

F I G. 1 6

| DISTRIBUTION DATA | |
|---|---|
| WORLD DISTRIBUTION DATA FOR FIRST COURSE | D1w |

| BEST TIME | 2:13:542 (MINUTES:SECONDS:MICROSECONDS) |
|---|---|
| AVERAGE TIME | 2:43:652 |
| MINIMUM TIME | 3:13:762 |

| TIME SECTION | 100 | 99 | 98 | 97 | ... | 4 | 3 | 2 | 1 |
|---|---|---|---|---|---|---|---|---|---|
| FREQUENCY | 11 | 21 | 54 | 76 | ... | 46 | 15 | 6 | 2 |

| | |
|---|---|
| LOCAL DISTRIBUTION DATA FOR FIRST COURSE | D1l |
| WORLD DISTRIBUTION DATA FOR SECOND COURSE | D2w |
| LOCAL DISTRIBUTION DATA FOR SECOND COURSE | D2l |
| ⋮ | |
| WORLD DISTRIBUTION DATA FOR THIRTY-SECOND COURSE | D32w |
| LOCAL DISTRIBUTION DATA FOR THIRTY-SECOND COURSE | D32l |

# COMPUTER-READABLE STORAGE MEDIUM HAVING DISTRIBUTION CHART DISPLAY PROGRAM STORED THEREIN, INFORMATION PROCESSING APPARATUS, AND DISTRIBUTION CHART DISPLAY SYSTEM

CROSS REFERENCE TO RELATED APPLICATION

The disclosure of Japanese Patent Application No. 2007-274866, filed on Oct. 23, 2007, is incorporated herein by reference.

BACKGROUND OF THE INVENTION

1. Field of the Invention

The present invention relates to a computer-readable storage medium having a distribution chart display program stored therein, an information processing apparatus, and a distribution chart display system, and more particularly to a computer-readable storage medium having stored therein a distribution chart display program for displaying, on a predetermined scale, a distribution chart representing as elements a plurality of pieces of data each including a predetermined index, an information processing apparatus, and a distribution chart display system.

2. Description of the Background Art

Japanese Laid-Open Patent Publication No. 2005-118543 discloses that a plurality of players (users) of arcade game apparatuses are allowed to connect the arcade game apparatus to a server through the Internet so as to compete in skill with each other nationwide, so that the ranking of the players are announced.

The ranking announced as described above is typically a ranking for only players who achieved advanced performances, e.g., a ranking for top best 100 players. Therefore, results of many players who do not appear in the ranking are unknown, and therefore the players have no way to know their own ranks among all participants. This type of ranking is almost useless to players whose performances are far from advanced performance In order to solve the aforementioned problem, ranking or result information for all participants may be announced. In this case, however, increase of the number of participants or increase of the number of times each participant plays a game leads to increase of an amount of information to be announced, so that it is increasingly difficult for the players to know their rank among all the participants. Further, it is necessary to process large amounts of information, and therefore processing load of a computer is increased.

Further, the aforementioned ranking is unilaterally provided to each player through a screen so as to only announce players which achieved advanced performances, and the ranking is not used for allowing each player to perform interactive operations.

SUMMARY OF THE INVENTION

Therefore, an object of the present invention is to enable display of a distribution chart, based on a predetermined index, representing a plurality of pieces of data as elements, and to enable an interactive operation using the distribution chart.

The present invention has the following features to attain the object mentioned above. The reference numerals, figure numbers, and supplementary descriptions in the parentheses in the following description indicate an exemplary correspondence with the drawings so as to aid in understanding the present invention, and are not intended to limit, in any way, the scope of the present invention.

A computer-readable storage medium according to the present invention is a computer-readable storage medium for storing a distribution chart display program executed by a computer of an information processing apparatus for displaying, as elements of a distribution chart, a plurality of pieces of data (result data) each including a predetermined index (accomplishment time), on the distribution chart of a predetermined scale. The distribution chart display program causes the computer (10) of the information processing apparatus (3) to execute: a position coordinate point calculation step (S34); an identification image display step (S41); an identification image selection step (S51); and an associated process execution step (S52). The position coordinate point calculation step is a step of calculating position coordinate points for the plurality of pieces of data on the distribution chart, by using the predetermined scale and values represented by the predetermined index included in each of the plurality of pieces of data. The identification image display step is a step of displaying, at the position coordinate points calculated in the position coordinate point calculation step, identification images (icons), respectively, for enabling identification of each of the plurality of pieces of data. The identification image selection step is a step of selecting, in accordance with an input from an input device (7), one of the identification images displayed in the identification image display step. The associated process execution step is a step of executing a process associated with a portion of the plurality of pieces of data, the portion of the plurality of pieces of data being represented by the one of the identification images selected in the identification image selection step.

The distribution chart display program may cause the computer to further execute a scale determination step (S33) of determining the predetermined scale in accordance with at least one of, a maximum value (best time) among, a minimum value (minimum time) among, and an average value (average time) of, the values represented by the predetermined index included in each of the plurality of pieces of data corresponding to the elements of the distribution chart.

Further, the plurality of pieces of data may be each result data representing a play result of a predetermined game in units of users, and the predetermined index may be a game score representing a rank indicated by the play result of the predetermined game.

Further, the result data may represent the play result of a racing game, and the game score may be an accomplishment time for the racing game.

Further, when the one of the identification images selected in the identification image selection step represents the result data (the result data of a current player) of a user operating the input device, the associated process execution step may execute a process (S61) of causing the user to play again a game associated with the result data.

Further, when the one of the identification images selected in the identification image selection step represents the result data (the result data of a family) of a user, other than a user operating the input device, among users of the information processing apparatus, the associated process execution step may execute a process (S63) of causing the user operating the input device to compete with the user associated with the one of the identification images having been selected, by using play data representing an operation content obtained when the user associated with the one of the identification images having been selected has performed, in the predetermined game, a play represented by the result data.

Further, when the one of the identification images selected in the identification image selection step represents the result data (the friend result data) generated by another information processing apparatus, the associated process execution step may execute a process (S65) of transmitting, to the another information processing apparatus, play data representing an operation content obtained when a user operating the input device previously played the predetermined game.

Further, when the one of the identification images selected in the identification image selection step represents the result data (the champion result data, event result data) generated by another information processing apparatus, the associated process execution step may execute a process (S67, S69) of downloading play data representing an operation content of a user of the another information processing apparatus, the operation content being obtained when the result data is generated, from the information processing apparatus (8) storing the play data.

Further, the associated process execution step may execute, after the play data is downloaded from the information processing apparatus (8) storing the play data, a process of causing a user operating the input device to compete, by using the downloaded play data, with the user corresponding to the downloaded play data.

Further, the predetermined index may indicate skills represented by operation contents, of users, obtained when the plurality of pieces of data are generated.

Further, the associated process execution step may execute a process of causing the information processing apparatus to reproduce, by using operation information (play data) representing a content of an input operation which has been previously performed by a user and is represented by the one of the identification images selected in the identification image selection step, the input operation of the user.

Further, the identification image display step may display, in addition to the identification images, a plurality of dummy identification images (dummy icons) schematically representing a distribution of the elements on the distribution chart in accordance with distribution data (D1w, D11, D2w, D21, ... D32w, D321) representing the distribution.

Further, the distribution chart display program may cause the computer to further execute a total-number-of-images-to-be-displayed determination step (S35) of determining the total number of the plurality of dummy identification images to be displayed in the identification image display step, in accordance with a type (type of ranking) of the distribution chart and/or the total number of the plurality of pieces of data corresponding to the elements of the distribution chart.

Further, the distribution chart display program may cause the computer to further execute a number-of-images-to-be-displayed-for-each-time-section determination step (S36) of determining, in units of time sections into which the values represented by the predetermined index are classified, the number of the plurality of dummy identification images to be displayed, by using the distribution data.

Further, the distribution chart display program may cause the computer to further execute a display range determination step (S37) of determining, for each time section, a display range in which the plurality of dummy identification images are displayed, in accordance with the number of the plurality of dummy identification images to be displayed for each time section, which is determined in the number-of-images-to-be-displayed-for-each-time-section determination step.

Further, the distribution chart display program may cause the computer to further execute a display position determination step (S39) of determining at random display positions at which the number of the plurality of dummy identification images determined in the number-of-images-to-be-displayed-for-each-time-section determination step are displayed, within the display range determined in the display range determination step.

Further, the distribution chart display program may cause the computer to further execute an automatic generation step (S38) of automatically generating at random the plurality of dummy identification images.

An information processing apparatus (3) according to the present invention is an information processing apparatus for displaying, as elements of a distribution chart, a plurality of pieces of data (result data) each including a predetermined index (accomplishment time), on the distribution chart of a predetermined scale. The information processing apparatus comprises: position coordinate point calculation means (10); identification image display means (10); identification image selection means (10); and associated process execution means (10). The position coordinate point calculation means calculates position coordinate points for the plurality of pieces of data on the distribution chart, by using the predetermined scale and values represented by the predetermined index included in each of the plurality of pieces of data (S34). The identification image display means displays, at the position coordinate points calculated by the position coordinate point calculation means, identification images, respectively, for enabling identification of each of the plurality of pieces of data (S41). The identification image selection means selects, in accordance with an input from an input device, one of the identification images displayed by the identification image display means (S51). The associated process execution means executes a process associated with a portion of the plurality of pieces of data, the portion of the plurality of pieces of data being represented by the one of the identification images selected by the identification image selection means (S52).

A distribution chart display system according to the present invention is a distribution chart display system comprising a plurality of information processing apparatuses each of which displays, on a distribution chart of a predetermined scale, a plurality of pieces of data (result data), each including a predetermined index (accomplishment time), which are generated by the plurality of information processing apparatuses (3), as elements of the distribution chart. The distribution chart display system comprises: the plurality of information processing apparatuses, and a data management apparatus (8) for collecting, from the plurality of information processing apparatuses, the plurality of pieces of data each including the predetermined index. The data management apparatus includes: reception means (81, 84); distribution data generation means (81); and transmission means (81, 84). The reception means receives, from the plurality of information processing apparatuses, the plurality of pieces of data each including the predetermined index (S70). The distribution data generation means generates distribution data representing a distribution of the elements of the distribution chart, in accordance with the plurality of pieces of data received by the reception means (S75). The transmission means transmits the distribution data to the plurality of information processing apparatuses (S76). Each information processing apparatus includes: position coordinate point calculation means (10); identification image display means (10); identification image selection means (10); and associated process execution means (10). The position coordinate point calculation means calculates position coordinate points for the plurality of pieces of data on the distribution chart, by using the predetermined scale and values represented by the predetermined index included in each of the plurality of pieces of data stored in said each information processing apparatus (S34). The identification image display means displays, at the position coordinate points calculated by the position coordinate point calculation means, identification images, respectively, for enabling identification of each of the plurality of pieces of data stored in said each information processing apparatus, and displays, in accordance with the distribution data received from the data management apparatus, a plurality of dummy identification images schematically representing the distribution of the plurality of pieces of data generated by the plurality of information processing apparatuses (S41). The identification image selection means selects, in accordance with an input from an input device, one of the identification images displayed by the identification image display means (S51). The associated process execution means executes a process associated with a portion of the plurality of pieces of data, the portion of the plurality of pieces of data being represented by the one of the identification images selected by the identification image selection means (S52).

According to the present invention, a user is allowed to confirm a distribution of a plurality of pieces of data based on the displayed distribution chart, and simultaneously issue, in an interactive manner, an instruction for executing a process associated with desired data, thereby enhancing operability.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a diagram illustrating exemplary result data;

FIG. 13 is a diagram illustrating exemplary ghost data;

FIG. 14 is a diagram illustrating exemplary play data;

FIG. 15 is a diagram illustrating exemplary result data database;

FIG. 16 is a diagram illustrating exemplary distribution data;

DESCRIPTION OF THE PREFERRED EMBODIMENTS (Entire Structure of Game System)

Figure 1:
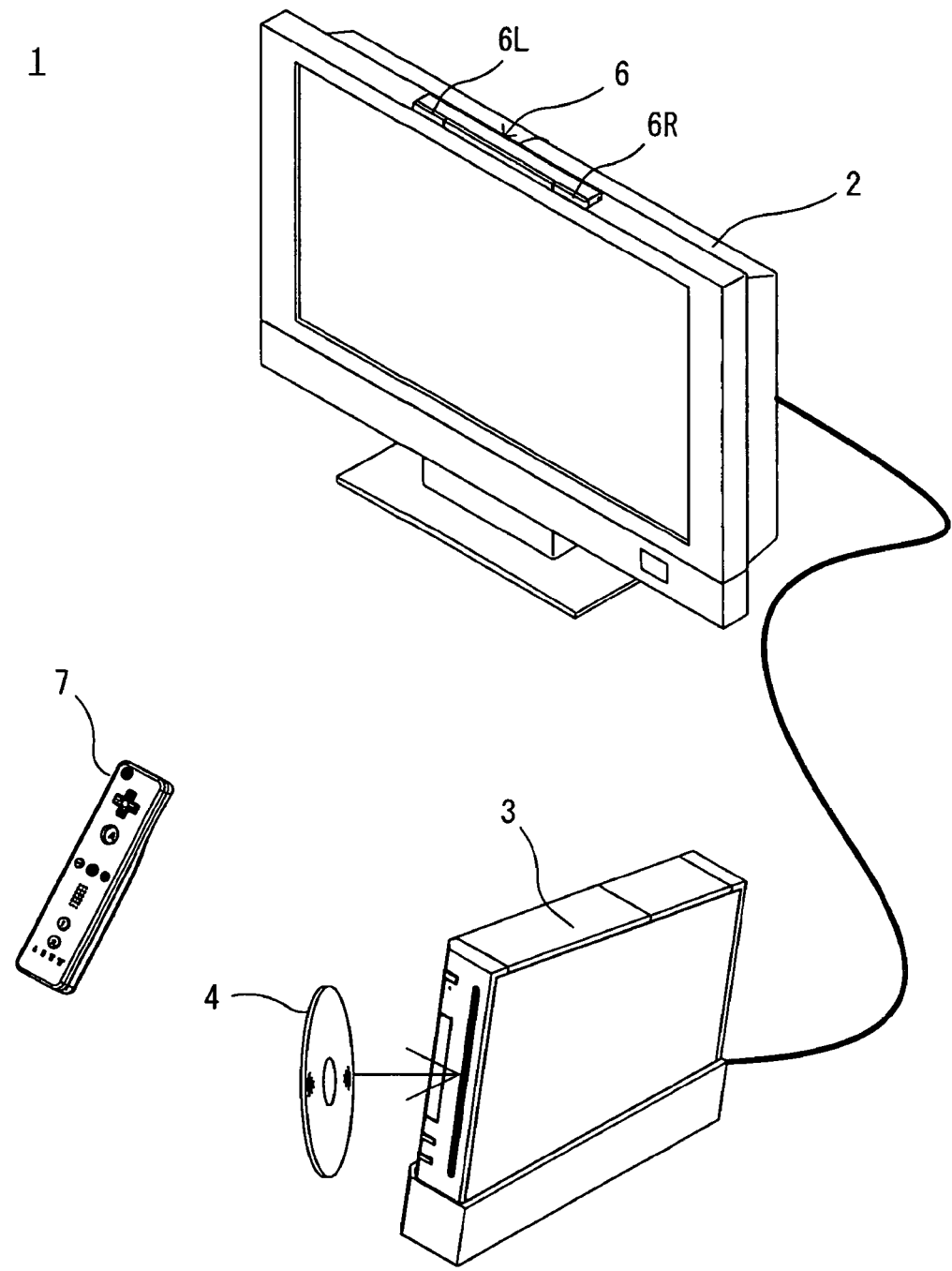
FIG. 1 is an external view illustrating a game system 1 according to an embodiment of the present invention.

With reference to FIG. 1, a game system 1 including a game apparatus according to an embodiment of the present invention will be described. FIG. 1 is an external view illustrating the game system 1. Hereinafter, a game apparatus and a game program according to the present embodiment will be described by using a stationary game apparatus as an example. As shown in FIG. 1, the game system 1 includes a television receiver (hereinafter, referred to simply as a "television set") 2, a game apparatus 3, an optical disc 4, a marker section 6, and a controller 7. The system according to the present embodiment allows the game apparatus 3 to execute game processing based on a game played using the controller 7.

Into the game apparatus 3, the optical disc 4, which typifies an information storage medium and is exchangeable with respect to the game apparatus 3, is detachably inserted. In the optical disc 4, the game program executed by the game apparatus 3 is stored. The game apparatus 3 has, on the front surface thereof, an opening through which the optical disc 4 is inserted. The game apparatus 3 executes the game processing by reading and executing the game program stored in the optical disc 4 which is inserted in the game apparatus 3 through the opening.

The game apparatus 3 is connected through a connection cord to the television set 2 typifying a display device. The television set 2 displays a game image generated through the game processing executed by the game apparatus 3. Further, the marker section 6 is provided in the vicinity of the screen of the television set 2 (on the top surface of a screen of the television set 2 in FIG. 1). The marker section 6 includes two markers, a marker 6R and a marker 6L, at both ends thereof. Specifically, each of the markers 6R and 6L includes at least one infrared LED, and emits an infrared light forward from the television set 2. The marker section 6 is connected to the game apparatus 3, and the game apparatus 3 is capable of controlling each infrared LED included in the marker section 6 so as to be lit up.

The controller 7 is an input device for supplying, to the game apparatus 3, operation data representing a content of an operation performed on the controller 7. The controller 7 is connected to the game apparatus 3 by wireless communication. In the present embodiment, for example, the Bluetooth (registered trademark) technology is used for the wireless communication between the controller 7 and the game apparatus 3. In another embodiment, the controller 7 and the game apparatus 3 may communicate with each other by a wired connection.

(Internal Structure of Game Apparatus 3)

Figure 2:
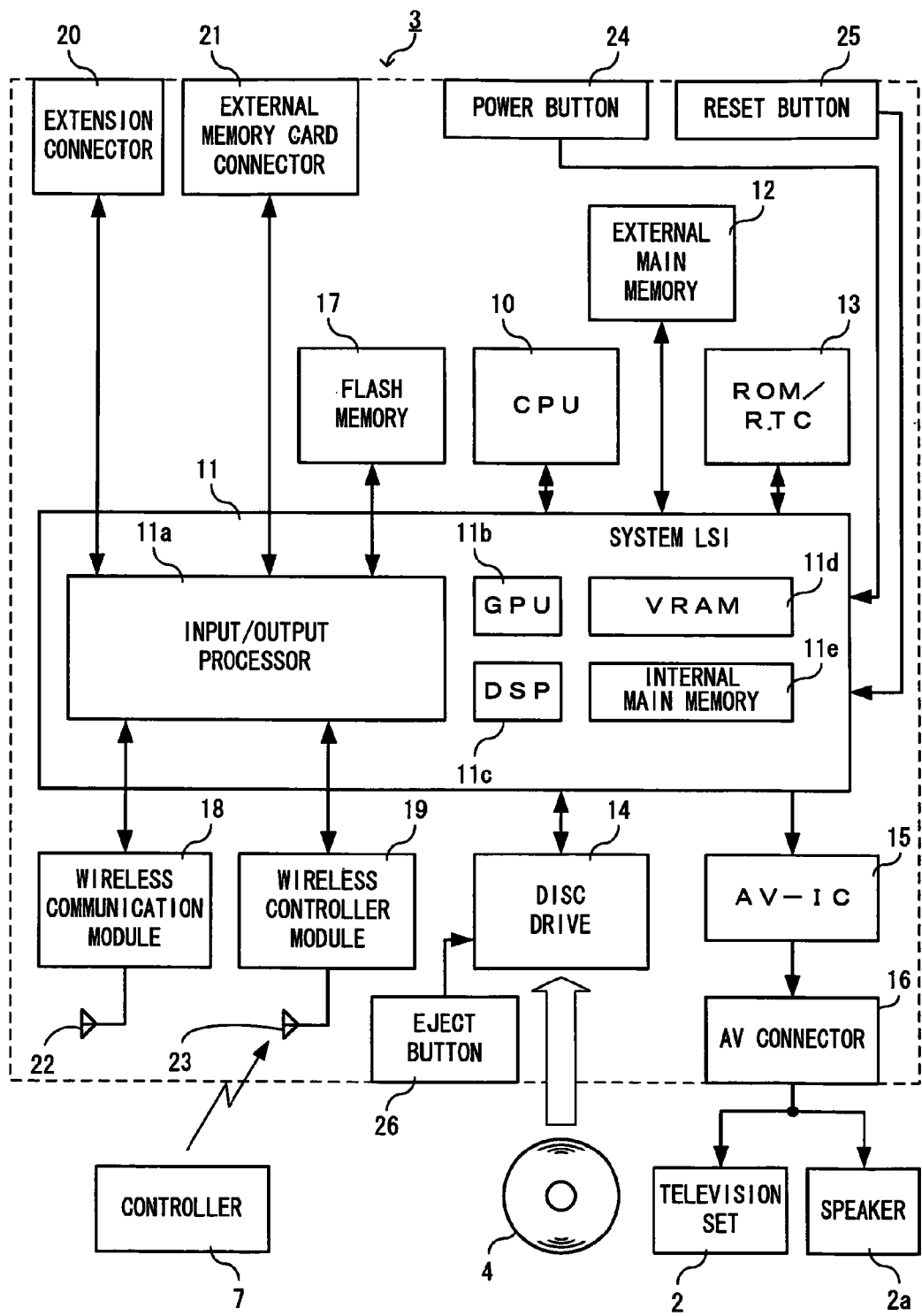
FIG. 2 is a functional block diagram of a game apparatus 3.

Next, with reference to FIG. 2, an internal structure of the game apparatus 3 will be described. FIG. 2 is a block diagram illustrating a structure of the game apparatus 3. The game apparatus 3 includes: the CPU 10; a system LSI 11; an external main memory 12; a ROM/RTC 13; a disc drive 14; an AV-IC 15, and the like.

The CPU 10, serving as a game processor, executes the game program stored in the optical disc 4 so as to perform the game processing. The CPU 10 is connected to the system LSI 11. In addition to the CPU 10, the external main memory 12, the ROM/RTC 13, the disc drive 14, and the AV-IC 15 are also connected to the system LSI 11. The system LSI 11 performs processing such as control of data transmission between respective components connected thereto, generation of an image to be displayed, and acquisition of data from an external apparatus. An internal structure of the system LSI will be described below. The external main memory 12, which is of a volatile type, stores programs, such as a game program loaded from the optical disc 4 or a flash memory 17, and various data, and is used as a work area and a buffer area for the CPU 10. The ROM/RTC 13 includes a ROM (so-called a boot ROM) incorporating a program for booting the game apparatus 3, and a clock circuit (RTC: real time clock) for counting time. The disc drive 14 reads, from the optical disc 4, program data, texture data and the like, and writes the read data into an internal main memory 11e described below or the external main memory 12.

Provided in the system LSI 11 are an input/output processor (I/O processor) 11a, a GPU (graphics processor unit) 11b, a DSP (digital signal processor) 11c, a VRAM 11d, and the internal main memory 11e. These component 11a, 11b, 11c, 11d and 11e are connected to each other via an internal bus not shown.

The GPU 11b, which is a part of rendering means, generates an image in accordance with a graphics command (draw command) from the CPU 10. The VRAM 11d stores data (such as polygon data and texture data) necessary for the GPU 11b to execute the graphics command. When an image is generated, the GPU 11b generates image data by using the data stored in the VRAM 11d.

The DSP 11c functions as an audio processor, and generates audio data by using sound data and sound waveform (tone quality) data stored in the internal main memory 11e and the external main memory 12.

The image data and the audio data generated as described above, are read by the AV-IC 15. The AV-IC 15 outputs the read image data to the television set 2 via an AV connector 16, and also outputs the read audio data to a speaker 2a of the television set 2. Thus, an image is displayed on the television set 2, and a sound is outputted from the speaker 2a.

The I/O processor 11a executes data reception and transmission among the components connected thereto and download of data from an external apparatus. The I/O processor 11a is connected to the flash memory 17, a wireless communication module 18, a wireless controller module 19, an extension connector 20, and an external memory card connector 21. To the wireless communication module 18, an antenna 22 is connected, and to the wireless controller module 19, an antenna 23 is connected.

The I/O processor 11a is connected to a network via the wireless communication module 18 and the antenna 22 so as to communicate with other game apparatuses or various servers connected to the network. The I/O processor 11a accesses the flash memory 17 at regular time intervals so as to detect for data to be transmitted to the network. When the data to be transmitted is detected, the data is transmitted to the network via the wireless communication module 18 and the antenna 22. Further, the I/O processor 11a receives, via the network, the antenna 22 and the wireless communication module 18, data transmitted from the other game apparatuses or data downloaded from a download server, and stores the received data in the flash memory 17. The CPU 10 executes the game program so as to read the data stored in the flash memory 17, thereby using the read data on the game program. The flash memory 17 may store not only the data transmitted and received among the game apparatus 3, and other game apparatuses or the various servers, but also saved data (result data or intermediate step data of the game) of a game played with the game apparatus 3.

Further, the I/O processor 11a receives the operation data transmitted from the controller 7 via the antenna 23 and the wireless controller module 19, and (temporarily) stores the operation data in a buffer area of the internal main memory 11e or the external main memory 12.

Further, the I/O processor 11a is connected to the extension connector 20 and the external memory card connector 21. The extension connector 20, which is a connector used for interface such as a USB and an SCSI, allows communication with the network, without using the wireless communication module 18, by connecting, to the extension connector 20, a media such as an external storage medium, or a peripheral device such as another controller, or a wired communication connector. The external memory card connector 21 is a connector for connecting to the external memory card connector 21 the external storage medium such as a memory card. For example, the I/O processor 11a accesses the external storage medium via the extension connector 20 or the external memory card connector 21, so as to store data in the external storage medium or read data from the external storage medium.

The game apparatus 3 includes a power button 24, a reset button 25, and an eject button 26. The power button 24 and the reset button 25 are connected to the system LSI 11. When the power button 24 is pressed so as to be ON, the power is supplied to the respective components of the game apparatus 3 via an AC adapter which is not shown. Further, when the power button 24, which is ON, is pressed again, the game apparatus 3 shifts to a low power standby mode. Also in this state, power is being supplied to the game apparatus 3, and therefore the game apparatus 3 continues to be connected to the network such as the Internet. When the power supply, which is ON, is to be OFF, the power supply can be OFF by pressing the power button 24 for a predetermined time period or longer period. When the reset button 25 is pressed, the system LSI 11 restarts a boot program of the game apparatus 3. The eject button 26 is connected to the disc drive 14. When the eject button 26 is pressed, the optical disc 4 is ejected from the disc drive 14.

Types of communication performed by the game apparatus 3 according to the present embodiment will be described. The types of the communication can be mainly classified into two. Communication (hereinafter, referred to as "constant connection allowing communication") using a constantly connected network so as to allow communication even in the low power standby mode as described above, is classified as one of the types. For example, communication (hereinafter, referred to as "as-needed connection communication") for controlling connection and communication so as to be enabled, every time the necessity arises, depending on an application program of a communication competition game, or the like, is classified as the other of the types. In the constant connection allowing communication, the I/O processor 11a independently transmits transmission data written in the flash memory 17 and writes the received data in the flash memory 17, as described above, regardless of programs such as the game program described below. Therefore, when used is an application (such as a mail application) using the constant connection allowing communication, it is possible to write, in the flash memory 17, data to be transmitted, and read, from the flash memory 17, the received data. Further, in the constant connection allowing communication, the communication can be periodically performed even in the low power standby mode. Further, even when a predetermined game program is being executed, the communication can be performed as a background process.

Figure 3:
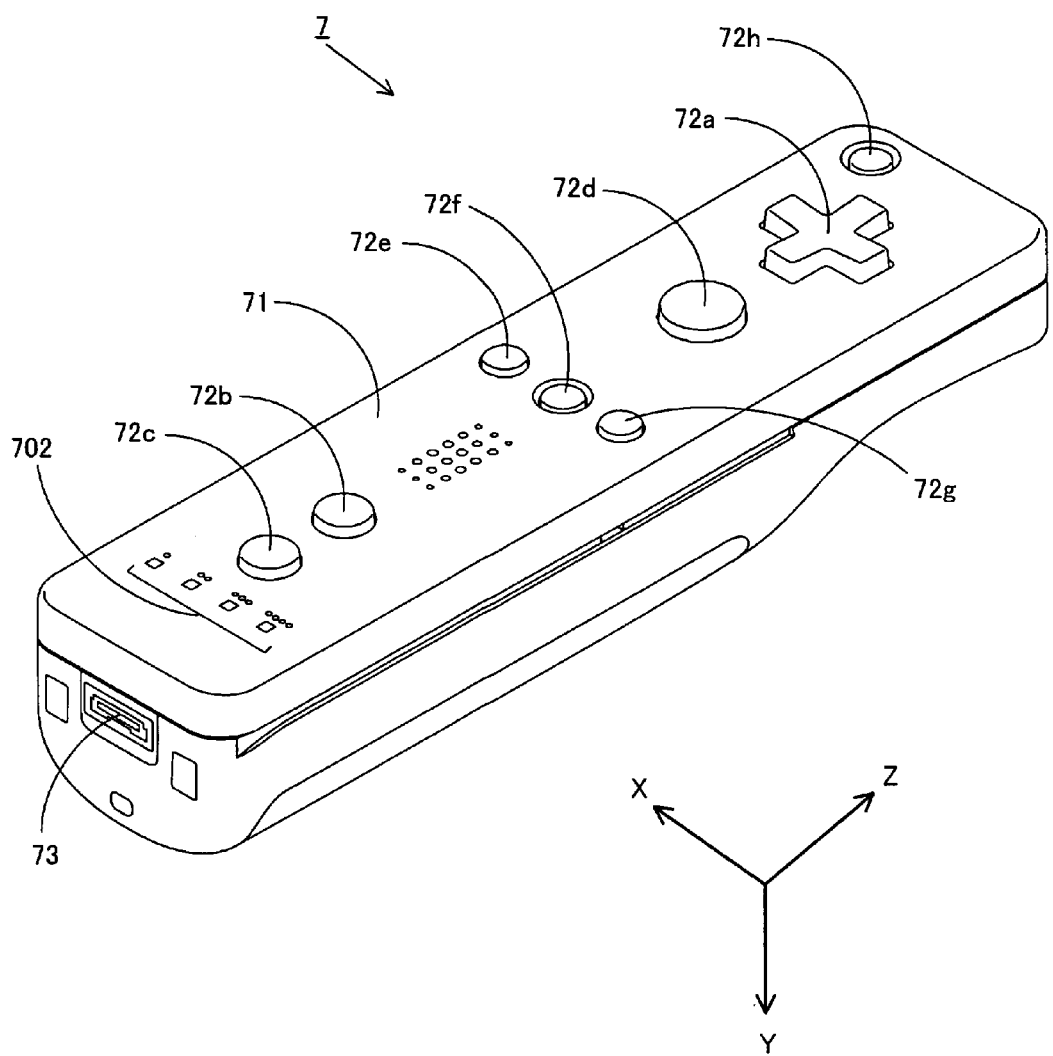
FIG. 3 is a perspective view of a controller 7 as viewed from the top rear side thereof.
Figure 4:
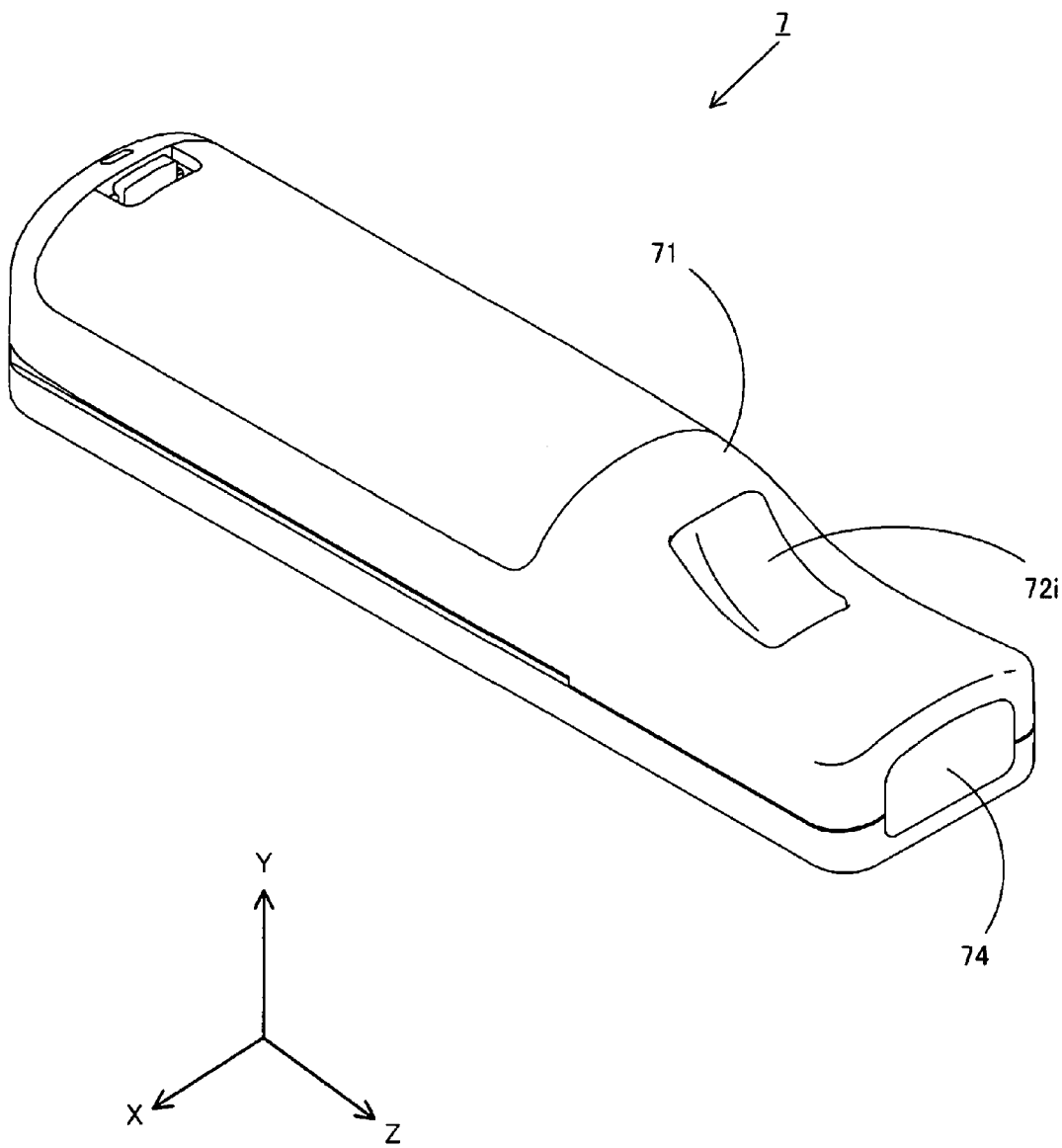
FIG. 4 is a perspective view of the controller 7 as viewed from the bottom front side thereof.

With reference to FIGS. 3 to 4, the controller 7 will be described. FIG. 3 is a perspective view of the controller 7 as viewed from the top rear side thereof. FIG. 4 is a perspective view of the controller 7 as viewed from the bottom front side thereof.

As shown in FIGS. 3 and 4, the controller 7 includes a housing 71 formed by plastic molding or the like, and the housing 71 includes an operation section 72 having a plurality of operation portions. The housing 71 has a generally parallelepiped shape extending in a longitudinal direction from front to rear. The overall size of the housing 71 is small enough to be held by one hand of an adult or even a child.

At the center of the front portion of the top surface of the housing 71, a cross key 72a is provided. The cross key 72a is a cross-shaped four-direction push switch. The cross key 72a includes operation portions corresponding to the four directions (front, rear, right and left), which are located on projecting portions, respectively, which are arranged at intervals of 90 degrees so as to form a cross. The player selects one of the front, rear, right and left directions by pressing a corresponding one of the operation portions of the cross key 72a. Through an operation on the cross key 72a, the player can, for example, indicate a direction in which a player character or the like appearing in a virtual game world is to move or select one of a plurality of options.

Although the cross key 72a is an operation section for outputting an operation signal in accordance with the aforementioned direction input operation performed by the player, such an operation section may be provided in another form. For example, the cross key 72a may be replaced with an operation section, including four push switches corresponding to directions, respectively, represented by a cross, for outputting an operation signal in accordance with the push switch having been pressed by the player. Alternatively, the cross key 72a may be replaced with an operation section including the aforementioned four push switches and a center switch provided at the center of the cross formed by the four push switches. Alternatively, the cross key 72a may be replaced with an operation section which includes an inclinable stick (so-called a joystick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Behind the cross key 72a on the top surface of the housing 71, a plurality of operation buttons 72b, 72c, 72d, 72e, 72f and 72g are provided. The operation buttons 72b, 72c, 72d, 72e, 72f and 72g are each an operation section for outputting a respective operation signal assigned to the operation buttons 72b, 72c, 72d, 72e, 72f or 72g when the player presses ahead thereof. For example, the operation buttons 72b, 72c, and 72d are assigned with functions of a first button, a second button, and an A button, for example. Further, the operation buttons 72e, 72f and 72g are assigned with functions of a minus button, a home button and a plus button, for example. The operation buttons 72a, 72b, 72c, 72d, 72e, 72f and 72g are assigned with various operation functions in accordance with the game program executed by the game apparatus 3. In an exemplary arrangement shown in FIG. 3, the operation buttons 72b, 72c and 72d are arranged in a line at the center in the front-rear direction on the top surface of the housing 71. The operation buttons 72e, 72f and 72g are arranged in a line in the left-right direction between the operation buttons 72b and 72d on the top surface of the housing 71. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for remote-controlling the power of the game apparatus 3 to be on or off. The operation button 72h also has a top surface thereof buried in the top surface of the housing 71, so as not to be inadvertently pressed by the player.

Behind the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to controller 7 that he or she is using. Specifically, when the controller 7 transmits transmission data to the wireless communication module 18, one of the plurality of LEDs 702 is lit up so as to correspond to the controller type.

On the top surface of the housing 71, a sound hole for outputting a sound from a speaker (speaker 706 shown in FIG. 5) described below is formed between the operation button 72b and the operation buttons 72e, 72f, and 72g.

On the bottom surface of the housing 71, a recessed portion is formed. The recessed portion is formed at a position at which an index finger or middle finger of a player is located when the player holds the controller 7 with one hand so as to orient the front surface thereof to the markers 6L and 6R. On a slope surface of the recessed portion on the bottom surface of the housing 71, an operation button 72i is provided. The operation button 72i is an operation section acting as, for example, a B button.

On the front surface of the housing 71, an image pickup element 743 included in the imaging information calculation section 74 is provided. The imaging information calculation section 74 is a system for analyzing image data taken by the controller 7 and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. The imaging information calculation section 74 will be described below in detail. On the rear surface of the housing 71, the connector 73 is provided. The connector 73 is, for example, an edge connector, and is used for engaging and connecting the controller 7 with, for example, the connection cable.

Here, for giving specific description, a coordinate system is defined for the controller 7. As shown in FIGS. 3 and 4, XYZ-axes orthogonal to each other are defined for the controller 7. Specifically, the Z-axis is defined along the longitudinal direction of the housing 71 corresponding to the front-rear direction of the controller 7, and the direction toward the front surface (the surface on which the imaging information calculation section 74 is provided) of the controller 7 is defined as the Z-axis positive direction. The Y-axis is defined along the top-bottom direction of the controller 7, and the direction toward the bottom surface (the surface on which the operation button 72*i* is provided) of the housing 71 is defined as the Y-axis positive direction. The X-axis is defined along the right-left direction of the controller 7, and the direction toward the left side surface (the side surface shown in FIG. 4 but not shown in FIG. 3) of the housing 71 is defined as the X-axis positive direction.

Figure 5:
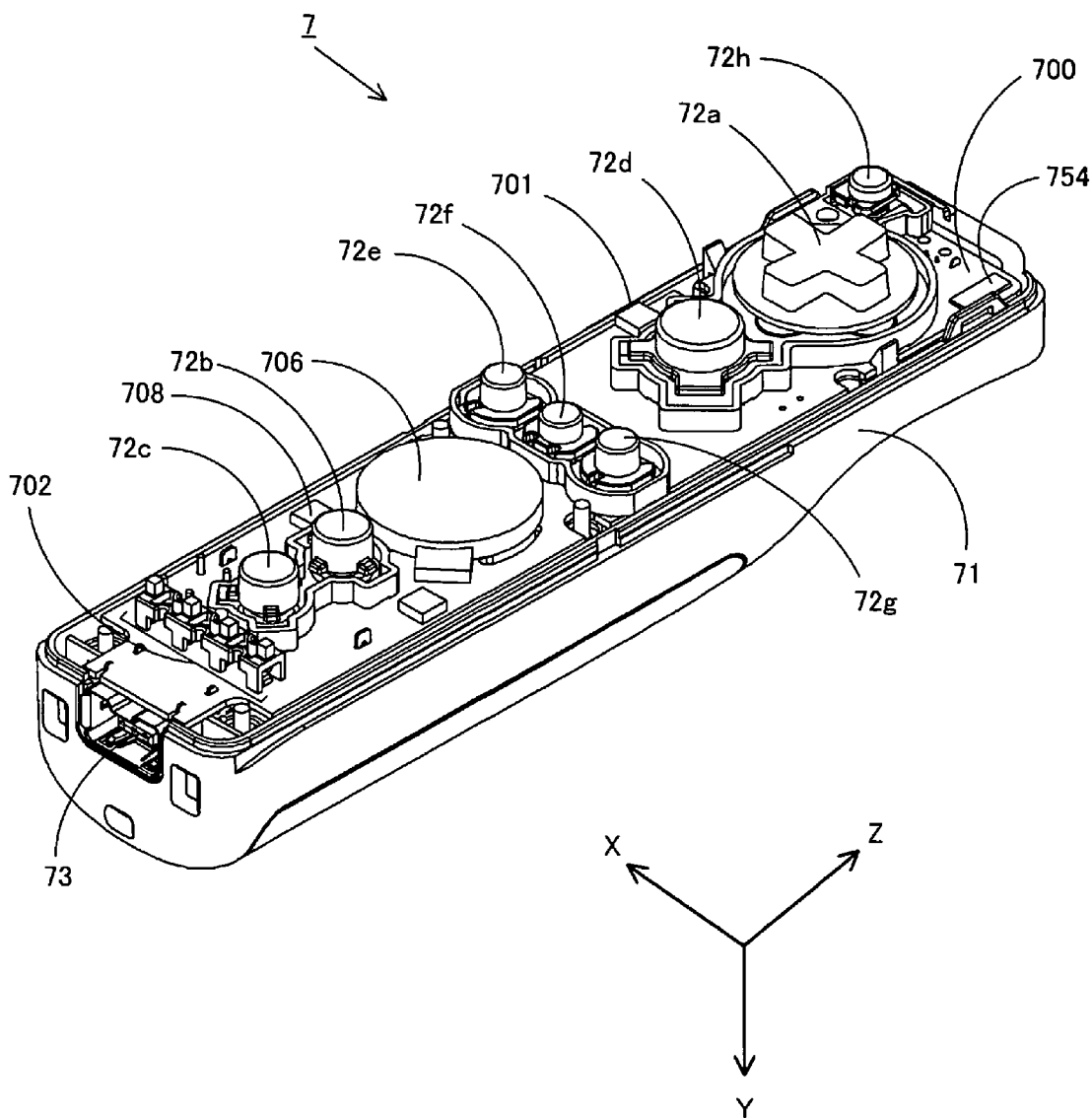
FIG. 5 is a perspective view illustrating a state where an upper housing of the controller 7 is removed.
Figure 6:
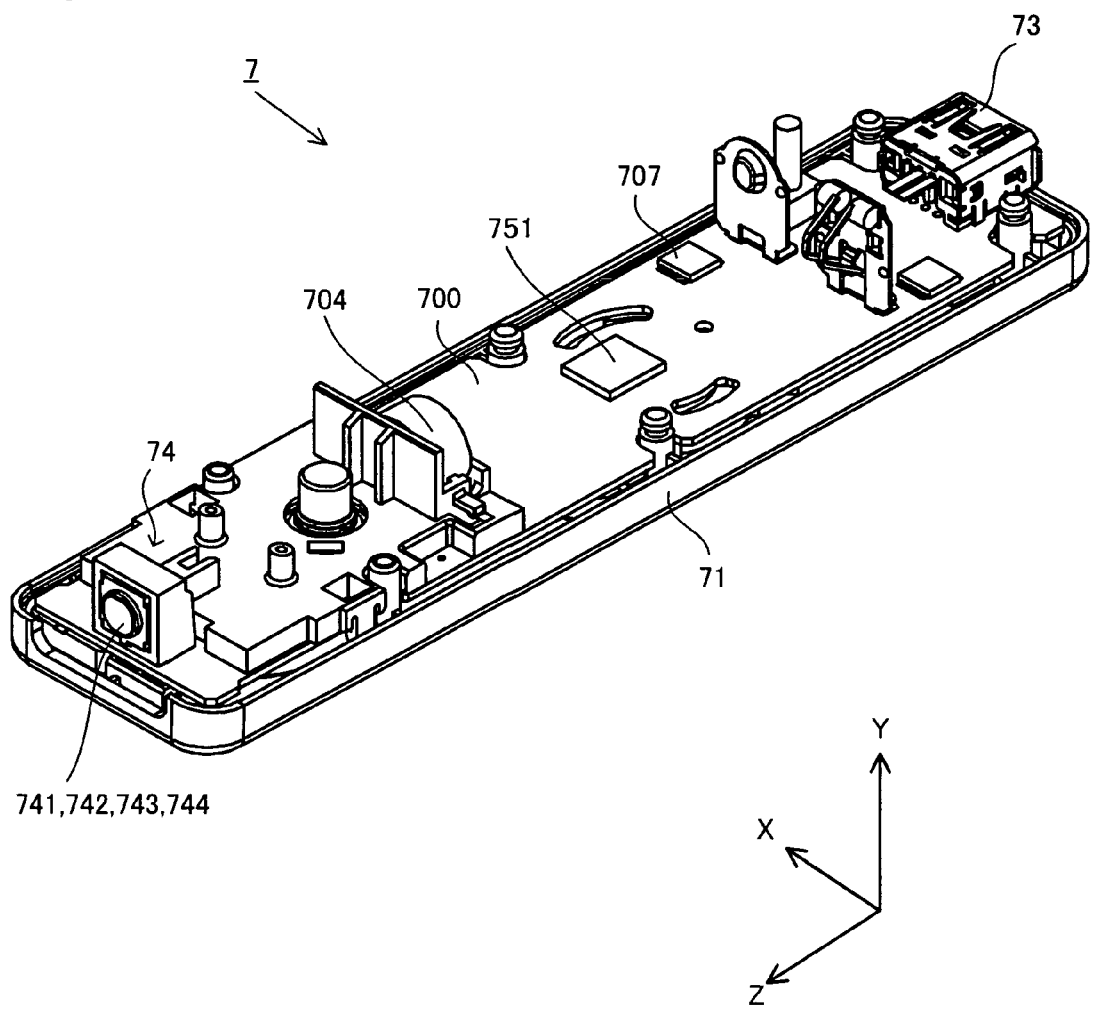
FIG. 6 is a perspective view illustrating a state where a lower housing of the controller 7 is removed.

With reference to FIGS. 5 and 6, an internal structure of the controller 7 will be described. FIG. 5 is a perspective view illustrating a state where an upper casing (a part of the housing 71) of the controller 7 is removed, as viewed from the rear surface side of the controller 7. FIG. 6 is a perspective view illustrating a state where a lower casing (apart of the housing 71) of the controller 7 is removed, as viewed from the front surface side of the controller 7. FIG. 6 is a perspective view illustrating a reverse side of a substrate 700 shown in FIG. 5.

As shown in FIG. 5, the substrate 700 is fixed inside the housing 71. On the top main surface of the substrate 700, the operation buttons 72*a*, 72*b*, 72*c*, 72*d*, 72*e*, 72*f*, 72*g* and 72*h*, an acceleration sensor 701, the LEDs 702, an antenna 754 and the like are provided. These elements are connected to a microcomputer 751 (see FIGS. 6 and 7) and the like via lines (not shown) formed on the substrate 700 and the like. The wireless module 753 (see FIG. 7) and the antenna 754 allow the controller 7 to act as a wireless controller. A quartz oscillator 703 (not shown), provided in the housing 71, generates a reference clock of the microcomputer 751 described below. On the top main surface of the substrate 700, the speaker 706 and an amplifier 708 are provided. The acceleration sensor 701 is provided to the left of the operation button 72*d* on the substrate 700 (that is, provided not at the center portion of the substrate 700 but near the periphery of the substrate 700). Accordingly, the acceleration sensor 701 is allowed to detect for both a direction change of the gravitational acceleration and an acceleration containing a component generated due to centrifugal force, in accordance with the controller 7 rotating about the longitudinal direction thereof. Therefore, by performing a predetermined calculation, the game apparatus 3 or the like is allowed to determine the rotation of the controller 17, with preferable accuracy, based on the acceleration data having been detected.

As shown in FIG. 6, at the front edge of the bottom main surface of the substrate 700, the imaging information calculation section 74 is provided. The imaging information calculation section 74 includes an infrared filter 741, a lens 742, the image pickup element 743 and an image processing circuit 744 located in order, respectively, from the front surface of the controller 7 on the bottom main surface of the substrate 700. At the rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 via a wiring formed on the substrate 700 and the like, and outputs an audio signal to the speaker 706 via the amplifier 708 in accordance with sound data transmitted from the game apparatus 3.

On the bottom main surface of the substrate 700, a vibrator 704 is provided. The vibrator 704 maybe, for example, a vibration motor or a solenoid. The vibrator 704 is connected to the microcomputer 751 by a wiring formed on the substrate 700 or the like, and is controlled so as to be ON/OFF in accordance with vibration data transmitted from the game apparatus 3. The controller 7 is vibrated by an actuation of the vibrator 704, and the vibration is conveyed to the player's hand holding the controller 7. Thus, a so-called vibration-feedback game is realized. The vibrator 704 is positioned slightly in front of the longitudinal center of the housing 71, and therefore a vibration of the housing 71 is enhanced so as to allow a player holding the controller 7 to easily feel the controller 7 vibrating.

Figure 7:
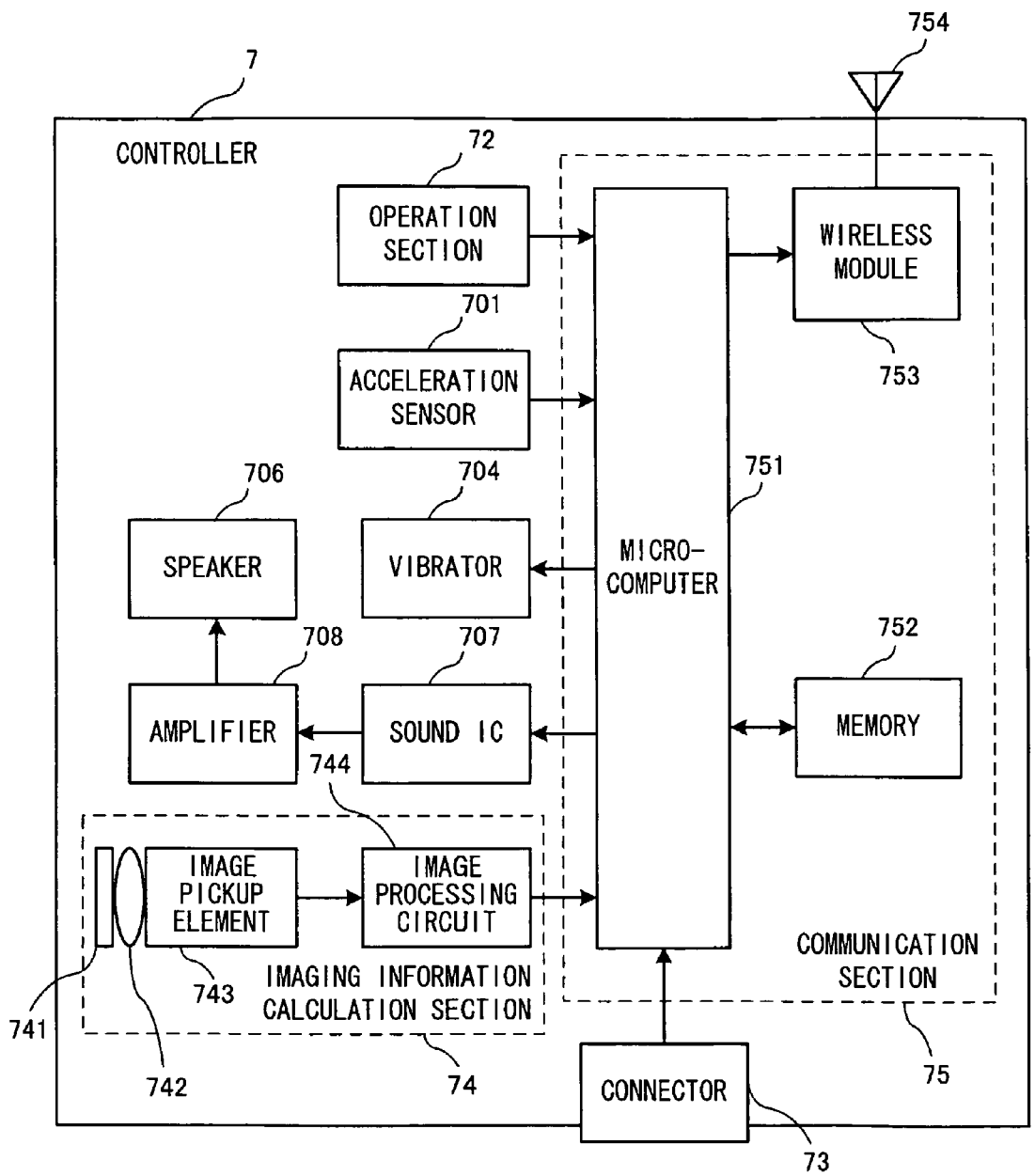
FIG. 7 is a block diagram illustrating a structure of the controller 7.

With reference to FIG. 7, the internal structure of the controller 7 will be described. FIG. 7 is a block diagram illustrating the structure of the controller 7.

As shown in FIG. 7, the controller 7 includes a communication section 75 in addition to the operation section 72, the imaging information calculation section 74, the acceleration sensor 701, the vibrator 704, the speaker 706, the sound IC 707, and the amplifier 708, which are described above.

The imaging information calculation section 74 includes the infrared filter 741, the lens 742, the image pickup element 743 and the image processing circuit 744. The infrared filter 741 allows only infrared light to pass therethrough, among light incident on the front surface of the controller 7. The lens 742 collects the infrared light which has passed through the infrared filter 741 and outputs the infrared light to the image pickup element 743. The image pickup element 743 is a solid-state image pick-up device such as, for example, a CMOS sensor or a CCD. The image pickup element 743 takes an image of the infrared light collected by the lens 742. Accordingly, the image pickup element 743 takes an image of only the infrared light which has passed through the infrared filter 741 and generates image data. The image data generated by the image pickup element 743 is processed by the image processing circuit 744. Specifically, the image processing circuit 744 processes the image data obtained from the image pickup element 743, identifies a spot thereof having a high brightness, and outputs, to the communication section 75, process result data representing a position coordinate point and the area size of the identified spot. The imaging information calculation section 74 is fixed to the housing 71 of the controller 7. The imaging direction of the imaging information calculation section 74 can be changed by changing the direction of the housing 71.

The controller 7 preferably includes a three-axis (X-axis, Y-axis, and Z-axis) acceleration sensor 701. The three axis acceleration sensor 701 detects a linear acceleration in three directions, that is, the up/down direction (Y-axial direction shown in FIG. 3), the left/right direction (X-axial direction shown in FIG. 3), and the forward/backward direction (the Z-axial direction shown in FIG. 3).

The communication section 75 includes the microcomputer 751, a memory 752, the wireless module 753 and the antenna 754. The microcomputer 751 controls the wireless module 753 for wirelessly transmitting the transmission data while using the memory 752 as a storage area during the processing. The microcomputer 751 controls operations of the sound IC 707 and the vibrator 704 based on the data received from the game apparatus 3 by the wireless module 753 via the antenna 754. The sound IC 707 processes the sound data and the like transmitted from the game apparatus 3 via the communication section 75. Further, the microcomputer 751 actuates the vibrator 704 based on, for example, the vibration data (for example, a signal for powering the vibrator 704 ON or OFF) transmitted by the game apparatus 3 via the communication section 75.

Data from the controller 7 including an operation signal (key data) from the operation section 72, acceleration signals (X, Y, and Z-axial direction acceleration data) of the three axial directions from the acceleration sensor 701, and the process result data from the imaging information calculation section 74 are outputted to the microcomputer 751. The microcomputer 751 temporarily stores the respective input data (the key data, the X, Y, and Z-axial direction acceleration data, and process result data) in the memory 752 as the transmission data which is to be transmitted to the wireless communication module 18. The wireless transmission from the communication section 75 to the wireless communication module 18 is performed periodically at predetermined time intervals. Since game processing is generally performed at a cycle of 1/60sec., data needs to be transmitted at a cycle of a time period shorter than the cycle of the game processing. Specifically, the game process unit is 16.7 ms (1/60sec.), and the transmission interval of the communication section 75 structured using the Bluetooth (registered trademark) technology is 5 ms. At a time at which the transmission to the wireless communication module 18 is to be performed, the microcomputer 751 outputs the transmission data stored in the memory 752 as a series of operation information to the wireless module 753. The wireless module 753 uses, for example, the Bluetooth (registered trademark) technology to transmit, from the antennal 754, operation information as a radio wave signal by using a carrier wave of a predetermined frequency. Thus, data from the controller 7 including the key data from the operation section 72, the X, Y, and Z-axial direction acceleration data from the acceleration sensor 701, and the process result data from the imaging information calculation section 74 are transmitted from the controller 7. The wireless communication module 18 of the game apparatus 3 receives the radio wave signal, and the game apparatus 3 demodulates or decodes the radio wave signal to obtain the series of operation information (the key data, the X, Y, and Z-axial direction acceleration data, and the process result data). Based on the obtained operation information and the game program, the CPU 10 of the game apparatus 3 performs the game processing. When the communication section 75 is structured by using the Bluetooth (registered trademark) technology, the communication section 75 can function so as to receive transmission data which is wirelessly transmitted from another device.

The structure of the game system 1 as described above is merely an example, and the present invention is applicable to any information terminal such as a hand-held game apparatus and a mobile telephone.

Figure 8:
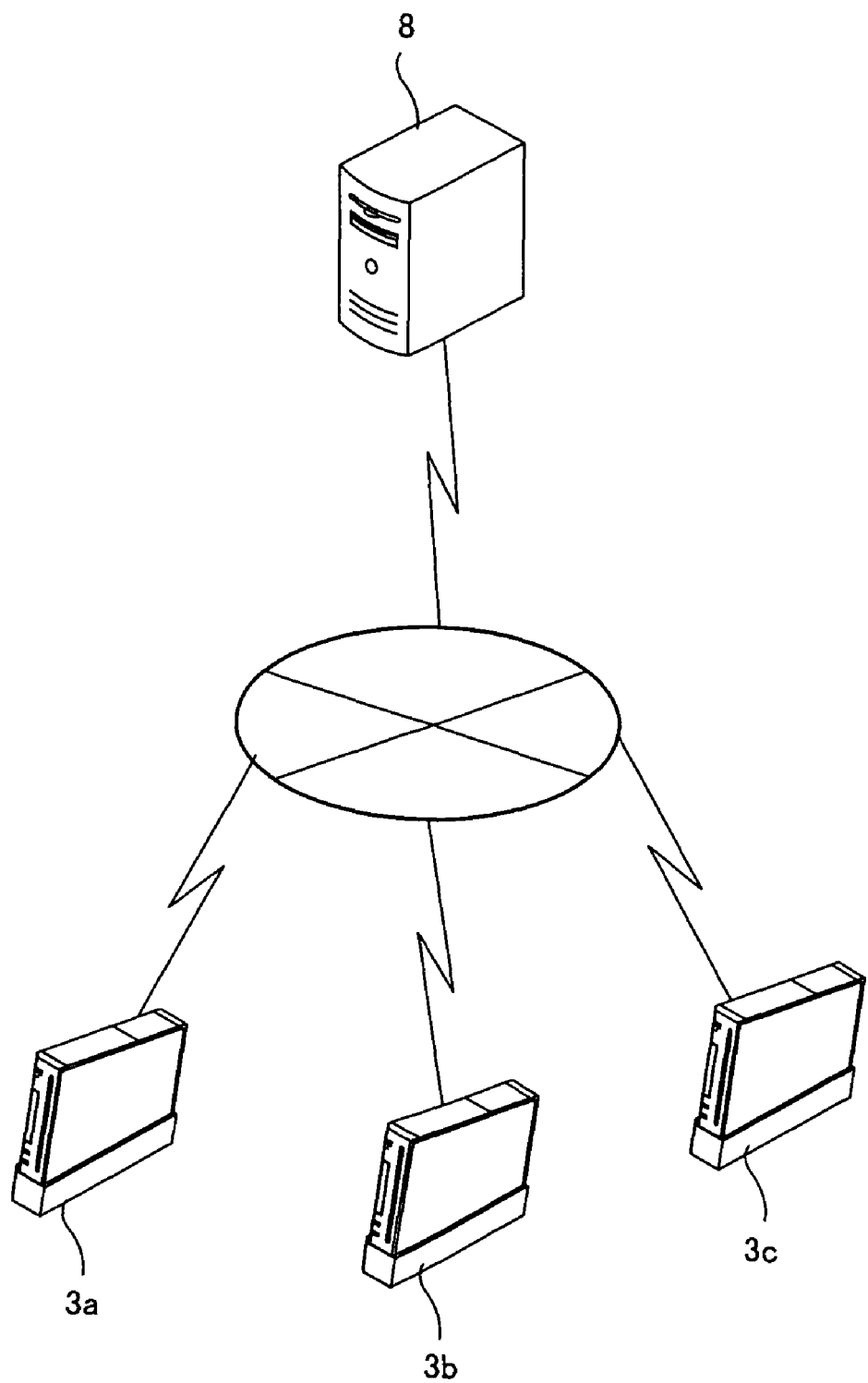
FIG. 8 is a diagram illustrating a configuration of a distribution chart display system.

According to the present embodiment, as shown in FIG. 8, a distribution chart display system comprises a server device 8 and a plurality (for example, three in FIG. 8) of the game apparatuses 3a, 3b, and 3c. In the following description, each of the plurality of the game apparatuses 3 is capable of communicating with the server device 8 through a communication network such as the Internet, for example. The communication between each of the plurality of the game apparatuses 3 and the server device 8 may be performed by using one of the constant connection allowing communication or the as-needed connection communication as described above.

Figure 9:
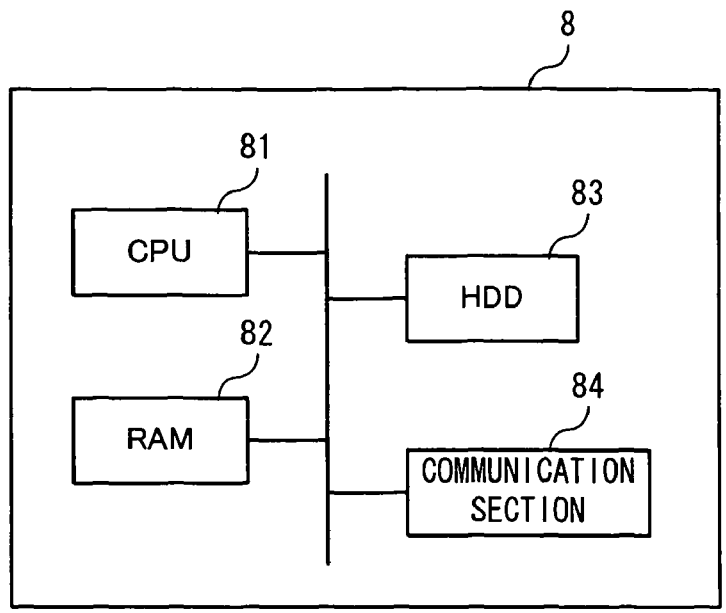
FIG. 9 is a block diagram illustrating a configuration of a server device 8.

The server device 8 is, in general, a typical general-purpose computer including the CPU 81, a RAM 82, an HDD 83, and a communication section 84, as shown in FIG. 9.

Hereinafter, operations performed by the game apparatus 3 and the server device 8 of the distribution chart display system will be described in detail.

Figure 10:
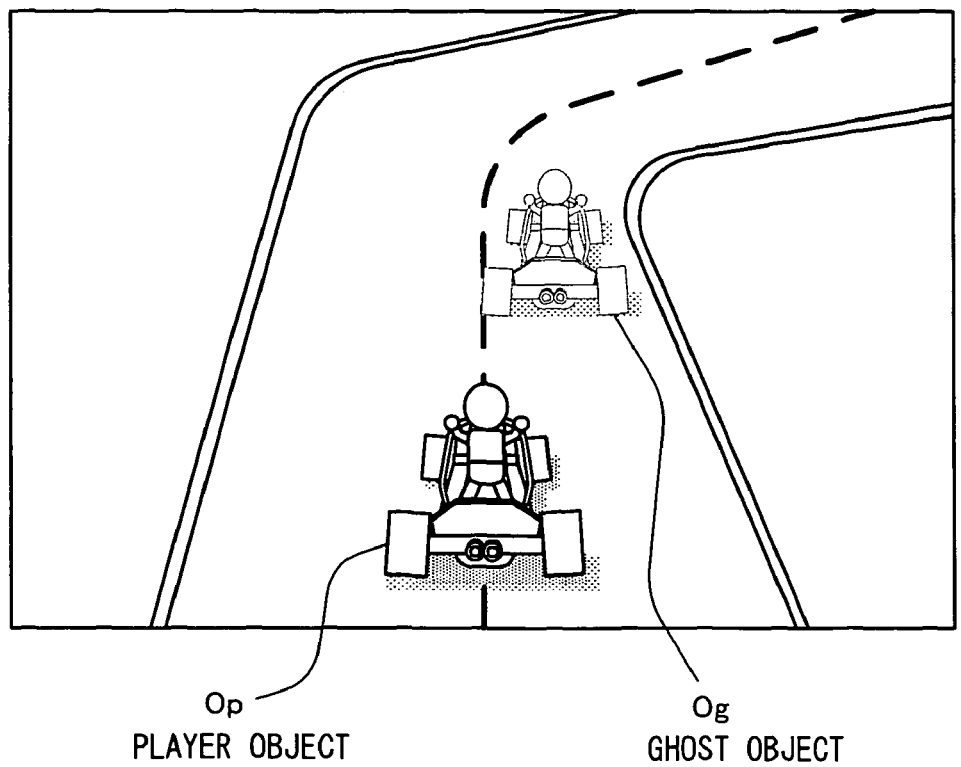
FIG. 10 is a diagram illustrating an example of a game screen displayed when a game is executed by the game apparatus 3.

FIG. 10 is a diagram illustrating an exemplary game screen of a game executed by the game apparatus 3. While in the present embodiment the game apparatus 3 executes a racing game, the present invention is not limited to a racing game.

In the racing game executed by the game apparatus 3, a player operates a player object Op in a game space by using the controller 7. In the racing game, a player is allowed to optionally select one game mode from among at least two game modes, that is, a time attack mode in which only the player object Op runs a racecourse, and a competing-with-ghost mode in which the player object Op competes with a ghost object Og, thereby playing the game in the selected game mode. FIG. 10 is a diagram illustrating an exemplary game screen displayed when a player is playing the game in the competing-with-ghost mode.

The ghost object Og represents an object which moves on a racecourse in a manner identical to (or almost the same as) that in which a player object Op, operated by a player (hereinafter, referred to as a current player) who is currently playing the game or another player, previously moved on the race course. A movement of the ghost object Og is controlled by the CPU 10 in accordance with ghost data (described below in detail) used for reproducing a movement of the player object Op which was previously operated during a game play. The ghost data is generated when a player plays the racing game.

The server device 8 collects the ghost data from the plurality of the game apparatuses 3 (the plurality of the game apparatuses 3 are not limited to the game apparatuses 3a, 3b, and 3c, and, for example, the number of the plurality of the game apparatuses 3 may be 10,000), and stores the ghost data in the HDD 83. In accordance with a request from one of the plurality of the game apparatuses 3, the server device 8 transmits, to the one of the plurality of the game apparatuses 3, appropriate ghost data among all the ghost data stored in the HDD 83. Thus, a user of the game apparatus 3 is allowed to download, as necessary, the ghost data, stored in the server device 8, of a user of another game apparatus 3, and compete with the user of the other game apparatus 3 by using the ghost data.

The game apparatus 3 may directly receive, from another game apparatus 3, the ghost data generated by the other game apparatus 3, through a communication line or a storage medium, instead of the ghost data generated by the other game apparatus 3 being downloaded from the server device 8.

Figure 11:
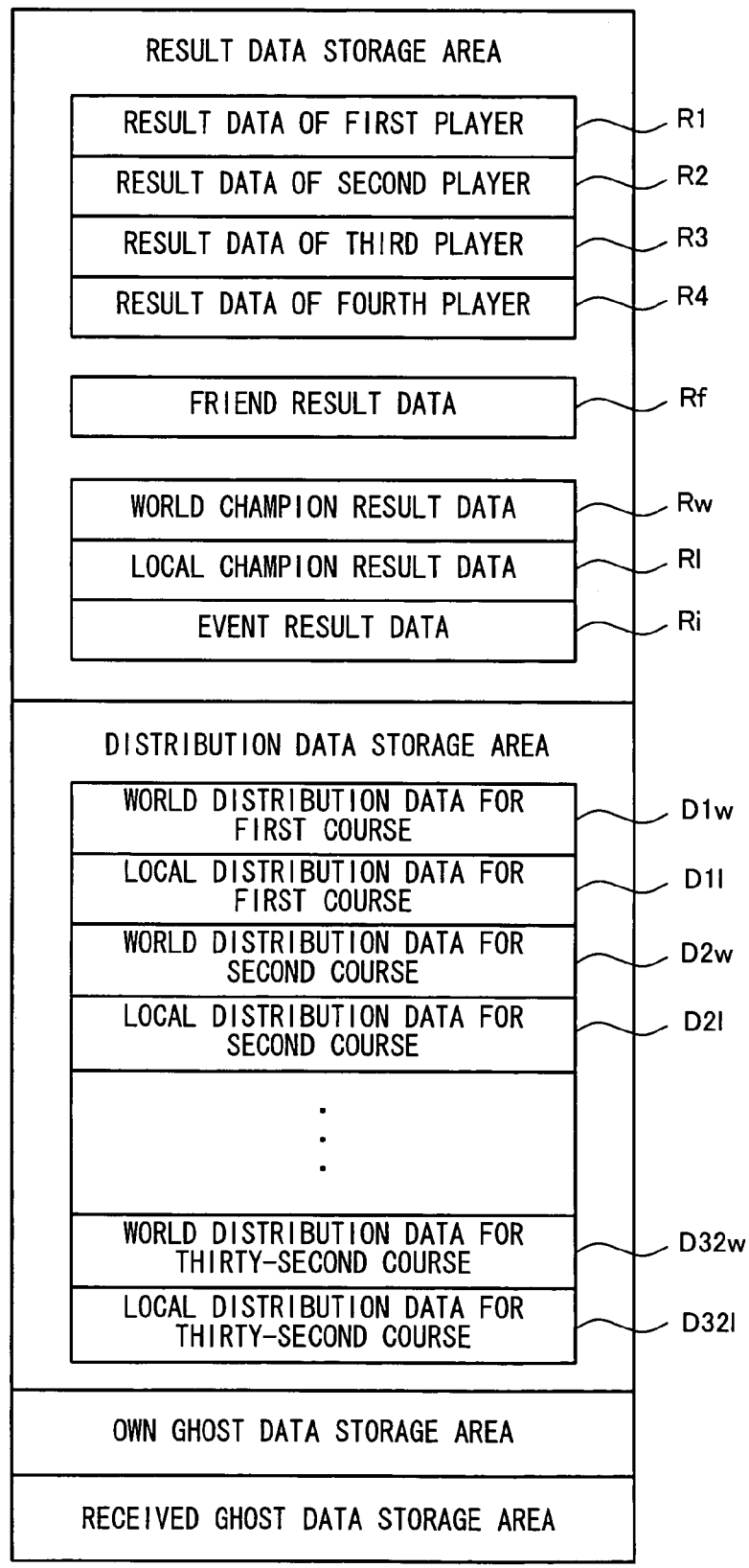
FIG. 11 is a diagram illustrating an exemplary memory map of a flash memory 17.

FIG. 11 is a diagram illustrating a memory map of the flash memory 17 of the game apparatus 3.

Result data of a racing game executed by the game apparatus 3 including the flash memory 17 itself, or result data of a racing game executed by another game apparatus 3 are stored in a result data storage area of the flash memory 17. The result data of the racing game executed by the game apparatus 3 including the flash memory 17 itself may be stored for each player, and, in an example shown in FIG. 11, the result data (R1, R2, R3, and R4) for four players, i.e., a first player to a fourth player, are stored. Friend result data Rf is result data of a player (hereinafter, referred to as a friend) of another game apparatus 3 which is previously registered by a user. The friend result data Rf is typically transmitted to the game apparatus 3 of the user from the game apparatus 3 of the friend through a communication network. World champion result data Rw is result data of a world champion having the best accomplishment time in the world. Local champion result data Rl is result data of a local champion having the best accomplishment time in a predetermined area (for example, Japan, the USA, and Europe). Event result data Rl is, for example, result data of a famous person or an imaginary player. The world champion result data Rw, the local champion result data Rl, and the event result data Ri are transmitted from the server device 8 to the game apparatus 3 through the communication network.

Distribution data (D1w, D11, D2w, D21, ..., D32w, D321) received from the server device 8 are stored in a distribution data storage area of the flash memory 17. In the present embodiment, 32 race courses, i.e., a first course to a thirty-second course, are provided for the racing game, and world distribution data and local distribution data are stored for each course in the distribution data storage area. The world distribution data has a population of players all over the world, and the local distribution data has a population of players in a predetermined area (for example, Japan, the USA, Europe). The local distribution data is transmitted from the server device 8 in accordance with a place in which the game apparatus 3 is set. Therefore, when the game apparatus 3 is set in, for example, Japan, the server device 8 transmits the local distribution data based on a population of Japanese players.

The ghost data (hereinafter, referred to as own ghost data) generated when the game apparatus 3 used by a user executes the racing game is stored in the own ghost data storage area of the flash memory 17. The own ghost data obtained in one complete play is stored for each racecourse in the own ghost data storage area. That is, the flash memory 17 is allowed to store the own ghost data for total 32 race courses.

The ghost data (hereinafter, referred to as received ghost data) having been downloaded from the server device 8, or received from another game apparatus 3, is stored in the received ghost data storage area of the flash memory 17. The received ghost data for maximum 32 users are allowed to be stored in the received ghost data storage area.

FIG. 12 is a diagram illustrating a specific example of the result data. The result data includes information such as: a name of a user who played the racing game; a user icon ID for defining a user icon used for identifying the user on a screen; a residence area of the user (that is, an area representing a place in which the game apparatus 3 is set); a course number of a racecourse used by the user playing the game; a character number indicating a driver of a racing car operated by the user; a machine type representing a type of the racing car operated by the user; accomplishment time representing an elapsed time from a start to a goal with an accuracy of $1/1000$ second; and the like.

FIG. 13 is a diagram illustrating a specific example of the ghost data. The ghost data includes information such as: a name of a user who played the racing game; a user icon ID for defining a user icon used for identifying the user on a screen; a residence area of the user; a course number of a racecourse used by the user playing the game; a character number indicating a driver of a racing car operated by the user; a machine type representing a type of the racing car operated by the user; play data representing a content of an operation performed by the user; accomplishment time representing an elapsed time from a start to a goal with an accuracy of $1/1000$ second; play date and time representing a date and time at which the racing game was played (that is, a date and time at which the ghost data was generated); and the like.

The play data represents a transition of an input operation performed by a user in a time period from a start to a goal in a race, as shown in FIG. 14. For example, the play data shown in FIG. 14 indicates that, on the controller 7, the A button 72*d* and a front operation portion of the cross key 72*a* are pressed in the time period from [0:0:000] (minute:second:microsecond) (that is, a start time) to [0:0:353], and only the A button 72*d* of the controller 7 is pressed in a time period from [0:0:354] to [0:1:001]. By using the play data, as necessary, any of the plurality of the game apparatuses 3 is allowed to reproduce, at any time, the movement of the player object Op operated in the racing game which was previously played.

In the present embodiment, data representing a transition of an input operation performed by a user is used as the play data to reproduce a movement of the player object Op in the racing game previously played. However, the present invention is not limited thereto. In another example, movement data representing a behavior of the player object Op in the racing game which was previously played, e.g., data representing a transition of a coordinate point indicating a position of the player object Op, may be used as the play data.

FIG. 15 is a diagram illustrating a specific example of a result data database stored in the HDD 83 of the server device 8. The result data of users collected from the plurality of the game apparatuses 3, the world champion result data, the respective local champion result data, and the event result data are stored in the result data database,. The HDD 83 of the server device 8 also stores the ghost data corresponding to the result data.

FIG. 16 is a diagram illustrating a specific example of distribution data transmitted to each game apparatus 3 from the server device 8. The server device 8 generates the distribution data representing a distribution of the accomplishment times, based on the result data stored in the result data database so as to periodically transmit the distribution data to the game apparatus 3. The distribution data transmitted to the game apparatus 3 is stored in the distribution data storage area of the flash memory 17 of the game apparatus 3. The distribution data includes a best time, an average time, a minimum time, and frequency information. The best time represents the best value of the accomplishment time in the population of a plurality of pieces of the result data. The average time represents an average value of the accomplishment times included in the plurality of pieces of the result data used as the population. The minimum time is calculated as (the average time)× 2−(the best time). The frequency information represents a frequency in units of time sections which are obtained by dividing a range from the best time to the minimum time of the accomplishment time into 100 time sections (for example, the range of the accomplishment time is divided into 100 time sections each having the same time period). Specifically, the frequency information represents, for each time section, the number of users for which the result data belong to said each time section of the accomplishment time. For example, in FIG. 16, the world distribution data D1w for the first course indicates that, among the result data, of users throughout the world, stored in the result data database, the number of users for which the result data belong to the time section [1] is two. Similarly, the number of users for which the result data belong to the time section [4] is 46. The value of the frequency represented by the frequency information may not be necessarily the actual number of users for which the result data belong to the relevant time section, and may be a value obtained by normalizing the actual number of users for which the result data belong to the relevant time section, as described below.

Figure 17:
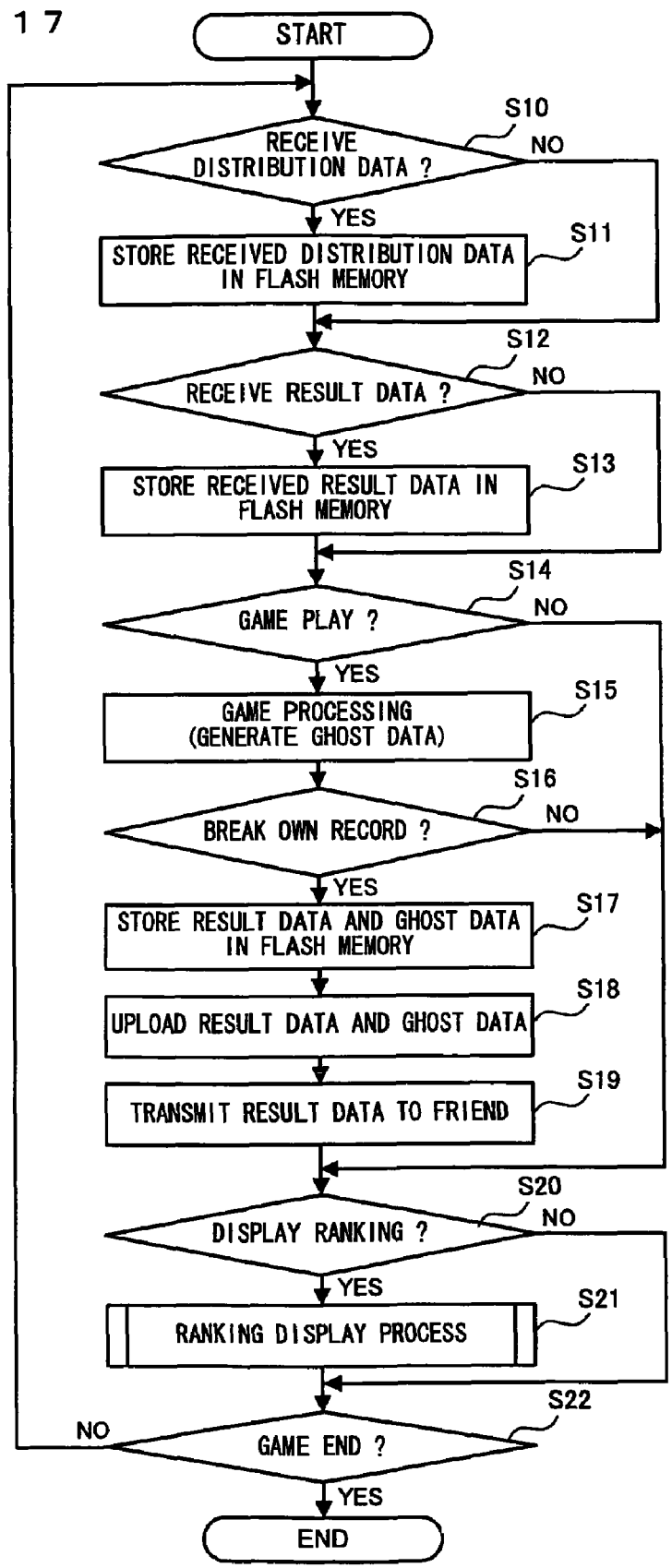
FIG. 17 is flow chart illustrating a flow of a process performed by the CPU 10 of the game apparatus 3.

Next, an operation performed by the CPU 10 of the game apparatus 3 will be described with reference to the flow chart shown in FIG. 17. The flow chart shows a flow of a process based on a racing game program executed by the CPU 10. The racing game program is stored in the optical disc 4, and loaded to the internal main memory 11*e* or the external main memory 12 as necessary. In another example, the racing game program may be supplied to the game apparatus 3 through a recording medium other than the optical disc 4 or through a communication line, or the racing game program may be previously stored in an internal storage device of the game apparatus 3.

When the execution of the racing game program is started, the CPU 10 determines, in step S10, whether or not the distribution data (FIG. 16) is received from the server device 8. When the distribution data is received, the process advances to step S11. Otherwise, the process advances to step S12.

In step S11, the CPU 10 stores the received distribution data (D1w, D11, D2w, D21, ..., D32w, D321) in the distribution data storage area of the flash memory 17. When the distribution data having been previously received is stored in the distribution data storage area, the distribution data having been previously received is replaced with the distribution data having been most recently received.

In step S12, the CPU 10 determines whether or not the result data is received from the server device 8 or the game apparatus 3 of a friend. When the result data is received, the process advances to step S13. Otherwise, the process advances to step S14.

In step S13, the CPU 10 stores, in the result data storage area of the flash memory 17, the received result data (the friend result data Rf, the world champion result data Rw, the local champion result data R1, or the event result data Ri). When the result data having the same type as the result data having been most recently received has been previously received and already stored in the result data storage area, the result data having been previously received is replaced with the result data having been most recently received.

In step S14, the CPU 10 determines whether or not the racing game is to be started, in accordance with an instruction inputted from a user using the controller 7. When the instruction for starting the racing game is inputted from the user, the process advances to step S15. Otherwise, the process advances to step S20.

In step S15, the CPU 10 executes game processing. Specifically, the CPU 10 controls the player object Op in a game world in accordance with operation information inputted from the controller 7, thereby generating a game image. In the competing-with-ghost mode in which the player object Op competes with the ghost object Og, the ghost object Og in the game world is controlled in accordance with any relevant ghost data (the own ghost data or the received ghost data) stored in the flash memory 17 of the game apparatus 3.

In step S15, the CPU 10 executes, while the aforementioned game processing is being performed, a process of generating ghost data including the play data described above, in accordance with the operation information inputted from the controller 7 while the racing game is being played.

When the racing game is ended, the CPU 10 determines, in step S16, whether or not the accomplishment time for the racecourse most recently used is better than the player's own record for the same racecourse. When the accomplishment time for the racecourse most recently used is better that the player's own record, the process advances to step S17. Otherwise, the process advances to step S20.

In step S17, the CPU 10 replaces the result data and the own ghost data of the player, which has been stored in the flash memory 17 for the same racecourse as that most recently used, with the result data and the own ghost data based on the racing game executed in step S15, thereby updating the result data and the own ghost data.

In step S18, the CPU 10 transmits the result data and the own ghost data based on the racing game executed in step S15 to the server device 8 through the wireless communication module 18 and the communication network. The result data and the ghost data transmitted to the server device 8 are stored in the HDD 83 of the server device 8. In particular, the result data is stored in the result data database shown in FIG. 15.

In step S19, the CPU 10 transmits, to the game apparatus 3 of a friend, the result data and the own ghost data based on the racing game executed in step S15.

In step S20, the CPU 10 determines whether or not the ranking is to be displayed, in accordance with an instruction inputted by a user using the controller 7. When the ranking is to be displayed, the process advances to step S21. Otherwise, the process advances to step S22.

Figure 23:
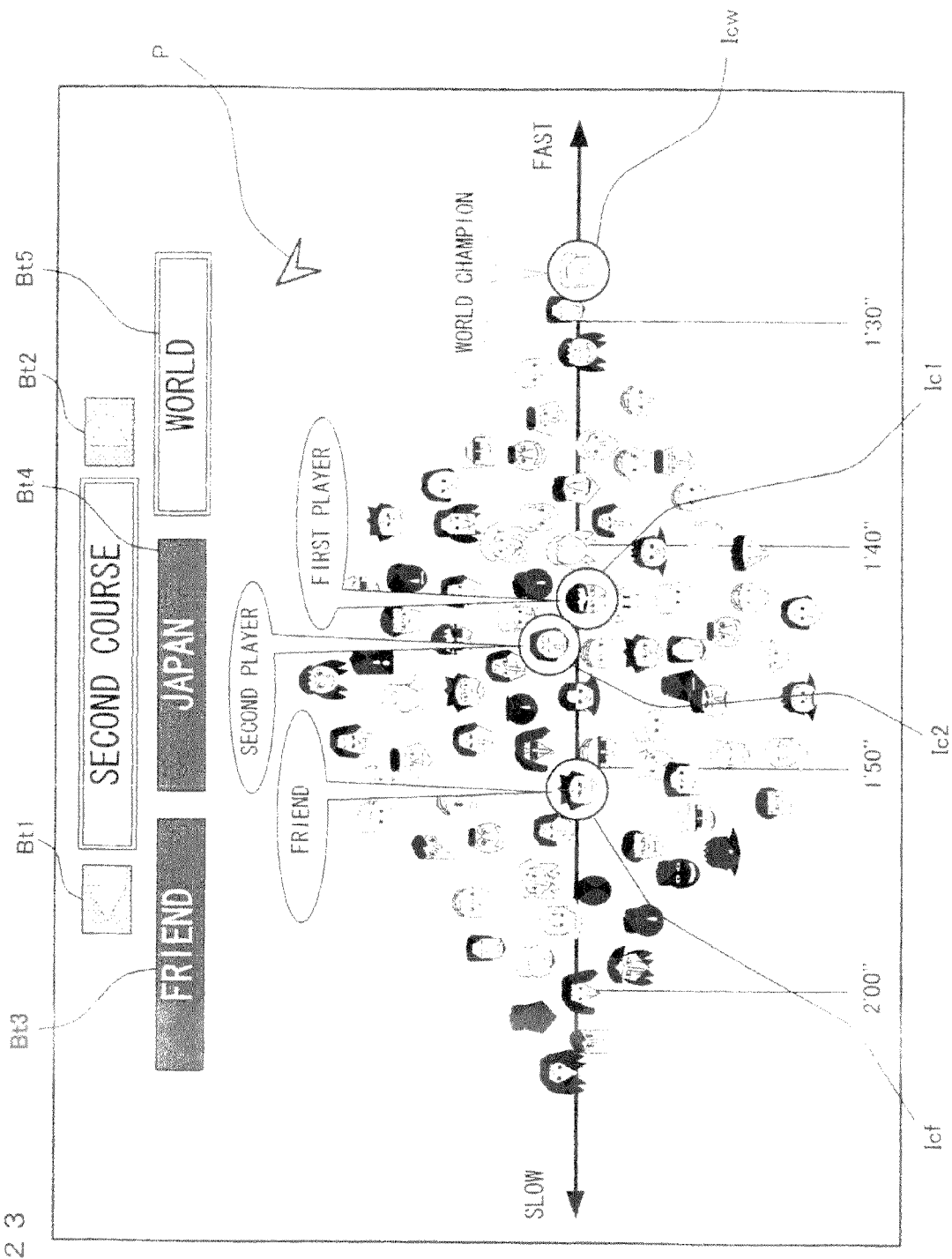
FIG. 23 is a diagram illustrating an exemplary distribution chart displayed on a screen of a television set 2.

In step S21, the CPU 10 performs ranking display process. The ranking display process is a process for displaying a distribution chart as shown in FIG. 23. The ranking display process will be described below in detail. When the ranking display process of step S21 is ended, the process advances to step S22.

In step S22, the CPU 10 determines whether or not the game is to be ended, in accordance with an instruction inputted by a user using the controller 7. That is, the CPU 10 determines whether or not the execution of the racing game program is to be ended. When the game is to be continued, the process is returned to step S10. When the game is to be ended, the execution of the game program is ended.

Figure 18:
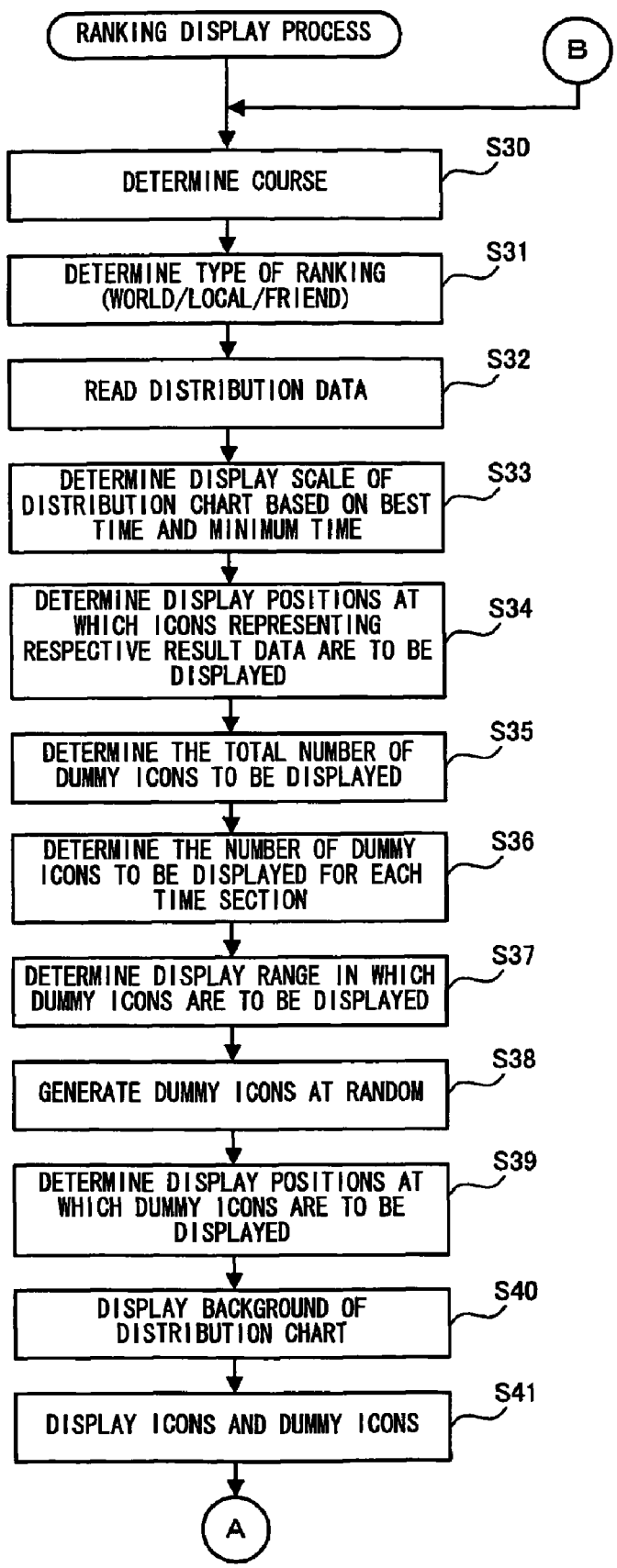
FIG. 18 shows a part of a flow chart illustrating in detail ranking display process.

Next, the ranking display process will be described in detail with reference to a flow chart shown in FIG. 18.

In step S30, the CPU 10 determines the racecourse (one of the racecourses of the first to the thirty-second courses) for which the ranking is to be displayed, in accordance with an instruction inputted by a user using the controller 7.

In step S31, the CPU 10 determines a type of the ranking, in accordance with an instruction inputted by a user using the controller 7. As the type of the ranking, three types of rankings, i.e., world ranking, local ranking, and friend ranking, are provided.

In step S32, the CPU 10 reads, from the distribution data storage area of the flash memory 17, the distribution data for the racecourse determined in step S30 and the type of the ranking determined in step S31. For example, when the racecourse determined in step S30 is the second course, and the type of the ranking determined in step S31 represents world ranking, the world distribution data D2w for the second course is read from the flash memory 17, and stored in the external main memory 12.

In step S33, the CPU 10 determines a display scale of the distribution chart, based on values represented by the best time and the minimum time included in the distribution data having been read in step S32. The display scale of the distribution chart is a parameter which influences correspondences between the accomplishment times and display positions (X coordinate values representing positions in the horizontal direction of the screen) on the screen. In the present embodiment, the display scale of the distribution chart is determined such that icons representing the result data in a range from the minimum time to the best time are displayed so as to be distributed substantially from the left end of the screen to the right end thereof, so that the distribution chart displayed on the screen is easily read. The display scale of the distribution chart may be determined in accordance with at least one of the best time, the average time, and the minimum time included in the distribution data. The determined display scale is stored in the external main memory 12.

Figure 24:
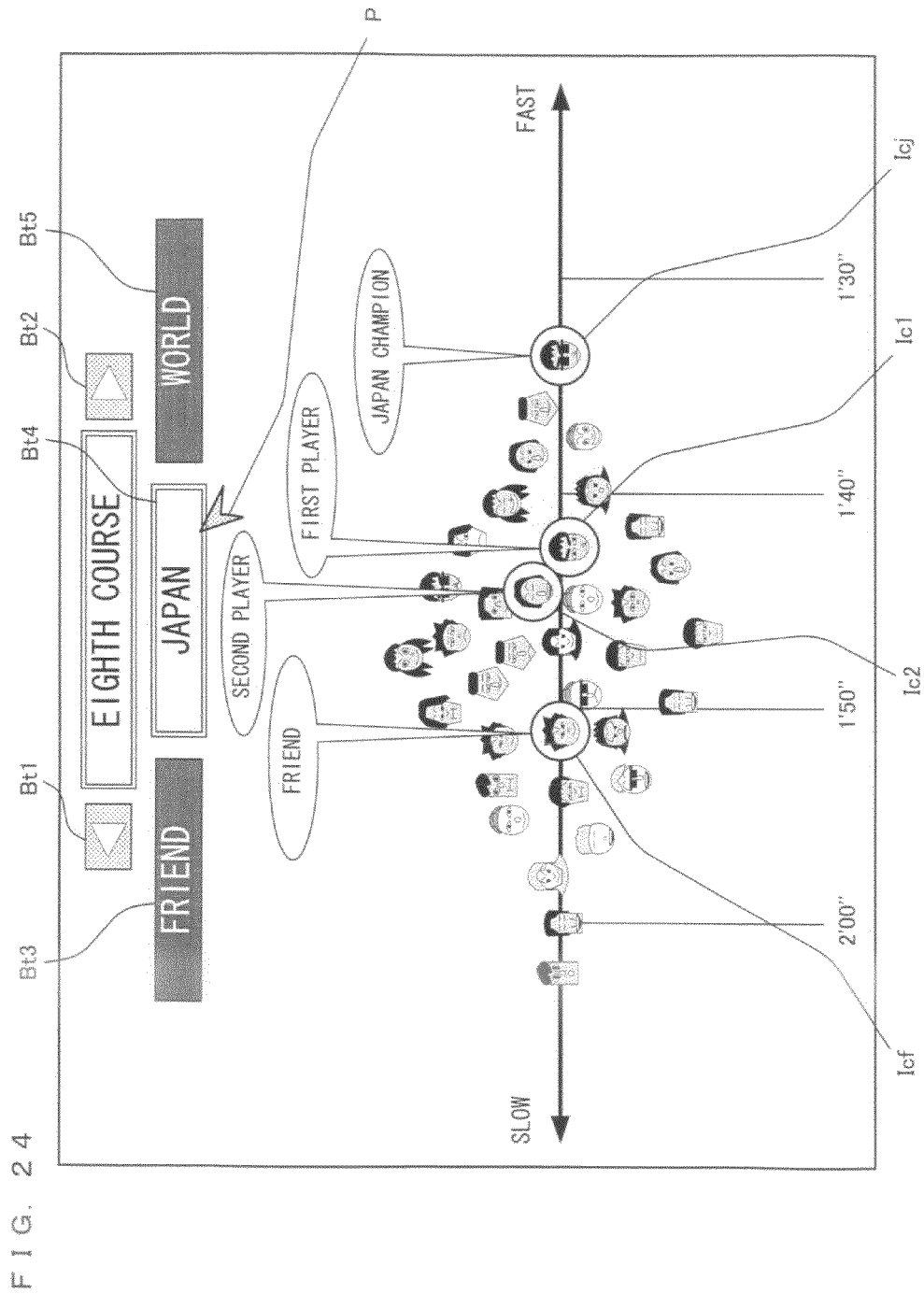
FIG. 24 is a diagram illustrating another exemplary distribution chart displayed on the screen of the television set 2.

In step S34, the CPU 10 determines display positions of the icons (Ic1, Ic2, Icf, and Icw shown in FIG. 23, and Icj shown in FIG. 24) representing the result data for the racecourse determined in step S30 and the type of the ranking determined in step S31, among all the result data stored in the result data storage area of the flash memory 17. The icons representing the result data are marks for identifying the respective result data on the distribution chart, and images of likenesses of users are used for the icons in the present embodiment. The present invention is not limited thereto, and any images enabling identification of the respective result data on the distribution chart may be used. The display positions (for example, X-coordinate values representing display positions in the horizontal direction of the screen) of the icons representing the respective result data are calculated based on the accomplishment times of the result data, and the display scale determined in step S33. In the present embodiment, the icons representing the respective result data are basically displayed on the axis (an axis which represents accomplishment times and is displayed on the background of the distribution chart) shown in FIG. 23, and therefore the display positions (Y-coordinate values) of the icons represent a constant value in the vertical direction of the screen. However, when the accomplishment times of the result data (as represented by, for example, the icon Ic1 of a first player and the icon Ic2 of a second player as shown in FIG. 23) represent almost a similar value, the Y-coordinate values of the icons are adjusted so as to prevent the icons from overlapping with each other. The positional information for the respective result data having been thus determined are stored in the external main memory 12.

In step S35, the CPU 10 determines the number of dummy icons to be displayed on the distribution chart. The dummy icons are icons displayed on the distribution chart in accordance with the distribution data which is read from the flash memory 17 in step S32, and different from the icons of which the display positions are determined in step S34. A plurality of the dummy icons are displayed on the distribution chart so as to represent an outline of the distribution of the result data corresponding to elements of the distribution chart, and the number of the plurality of the dummy icons are not necessarily the same as the number of the elements on the distribution chart. For example, when the number of icons to be displayed on the distribution chart is the same as the number of the elements on the distribution chart, and the number of the elements is enormous, the visibility of the distribution chart is substantially deteriorated. Therefore, in the present embodiment, the dummy icons are used so as to solve the problem. In the present embodiment, the CPU 10 determines the number of the dummy icons to be displayed on the distribution chart, in accordance with the type of the ranking determined in step S31. Specifically, when the type of the ranking represents the world ranking, 200 dummy icons are displayed on the distribution chart. When the type of the ranking represents the local ranking, 100 dummy icons are displayed on the distribution chart. When the type of the ranking represents the friend ranking, no dummy icons are displayed. In another example, the number of the dummy icons to be displayed on the distribution chart may be changed depending on the racecourse, or depending on the number of the elements (that is, the number of players to be ranked) on the distribution chart. The determined total number of the dummy icons to be displayed is stored in the external main memory 12.

In step S36, the CPU 10 determines the number of the dummy icons to be displayed for each time section, in accordance with the total number of the dummy icons to be displayed, which is determined in step S35, and the frequency information included in the distribution data. The number of the dummy icons to be displayed in the time section [n] (n is an integer from 1 to 100) is calculated in accordance with, for example, the following expression.

(the total number of the dummy icons to be displayed)×(frequency in time section [n])/(sum of the frequencies of all the time sections [1] to [100])

Specifically, the frequencies for the respective time sections are normalized such that the sum of the frequencies of all the time sections is equal to the total number of the dummy icons to be displayed, so as to determine, for each time section, the number of the dummy icons to be displayed. The decimal portion may be, for example, rounded up or rounded down. Alternatively, the decimal portion may be converted into 1 or 0 at a predetermined rate. The sum of the numbers, determined in step S36, of the dummy icons to be displayed for the respective time sections may not be necessarily the same as the total number of the dummy icons to be displayed, which is determined in step S35. Slight difference therebetween may be allowed. The determined number of the dummy icons to be displayed for each time section is stored in the external main memory 12.

Figure 21:
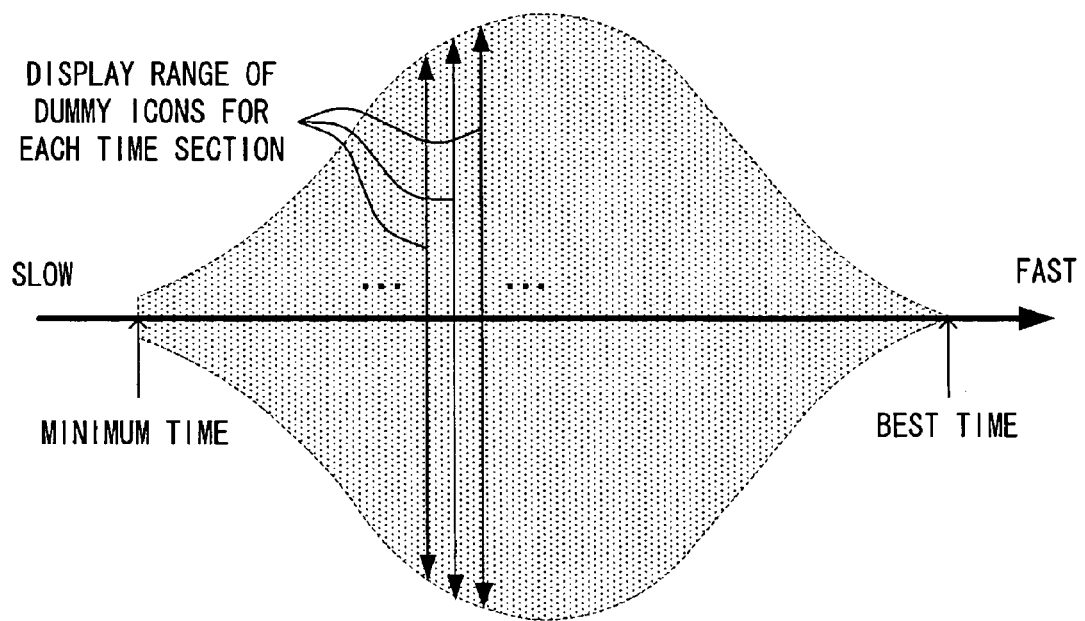
FIG. 21 is a diagram illustrating a method for determining a display range of dummy icons in each time section.
Figure 22:
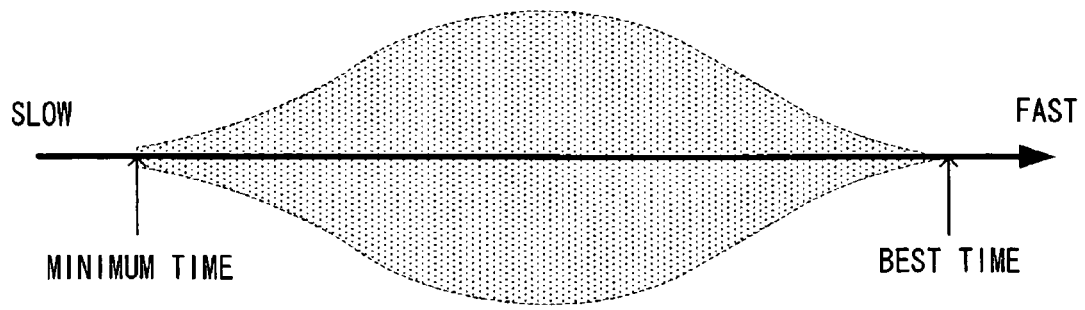
FIG. 22 is a diagram illustrating a method for determining a display range of dummy icons in each time section.

In step S37, the CPU 10 determines, for each time section, a display range in which the dummy icons are to be displayed, in accordance with the frequency information included in the distribution data. Hereinafter, with reference to FIG. 21, a method for determining the display range in which the dummy icons are to be displayed will be described. In the present embodiment, as shown in FIG. 23, a distribution chart having a time axis (an axis representing the accomplishment times) in the horizontal direction is displayed. The dummy icons belonging to the same one time section are positioned on one vertical line. Specifically, coordinate points at which the dummy icons are to be displayed are determined such that all the dummy icons belonging to the same one time section have the same X-coordinate value. A range of the Y-coordinate values of the display coordinate points (that is, a range in which the dummy icons are to be displayed) is determined for each time section based on the time axis, as shown in FIG. 21. The display range is determined for each time section in accordance with the frequency in said each time section. For example, the display range is determined for each time section such that the larger the frequency is, the wider the display range is. At this time, the display range for each time section may be changed in accordance with the total number of the dummy icons to be displayed. For example, when the total number of the dummy icons to be displayed is relatively large, the display range for the dummy icons in each time section may be relatively wide as shown in FIG. 21. When the total number of the dummy icons to be displayed is relatively small, the display range for the dummy icons in each time section may be relatively narrow as shown in FIG. 22. Thus, the dummy icons are displayed at an appropriate density regardless of the total number of the dummy icons to be displayed, so that the distribution chart is easily read. The display range for the dummy icons determined for each time section as described above is stored in the external main memory 12.

In step S38, the CPU 10 generates at random the necessary number of the dummy icons (that is, the sum of the numbers of the dummy icons to be displayed for the respective time sections, which is determined in step S36). Specifically, the CPU 10 determines at random parameters including an outline, a skin color, a hairstyle, a hair color, shapes of eyes, a nose, and a mouth, accessories such as a hat or glasses, and the like, thereby generating the respective dummy icons. The dummy icons may be generated in accordance with a predetermined rule instead of the parameters being determined completely at random. For example, when the ranking is displayed only for Japanese users, the skin color and the like used for the dummy icons may be appropriately determined so as to represent the Japanese. The parameters determined for the dummy icons are stored in the external main memory 12.

In step S39, the CPU 10 determines display positions at which the respective dummy icons generated in step S38 are to be displayed. The X-coordinate value representing the display position at which the dummy icon is to be displayed is determined in accordance with the time section to which the dummy icon belongs. The Y-coordinate value representing the display position at which the dummy icon is to be displayed is determined at random within the display range, determined in step S37, of the dummy icons for each time section. The display position of the dummy icon determined at random may be changed as necessary so as to prevent the dummy icon from substantially overlapping with another dummy icon or icons other than the dummy icons. The determined display positions of the respective dummy icons are stored in the external main memory 12.

In step S40, the CPU 10 displays, on the screen of the television set 2, the background, such as button images (Bt1 to Bt5) and the time axis shown in FIG. 23, of the distribution chart.

In step S41, the CPU 10 displays the icons representing the respective result data and the dummy icons on the background displayed in step S40, in accordance with the display positions of the icons representing the respective result data, which are determined in step S34, and the display positions of the respective dummy icons, which are determined in step S39. As a result, for example, an image as shown in FIG. 23 is displayed on the screen of the television set 2. When the icons representing the respective result data and the dummy icons are displayed, an animation may be displayed such that the icons representing the respective result data and the dummy icons are moved from the edge of the screen to the respective display position thereof.

Figure 19:
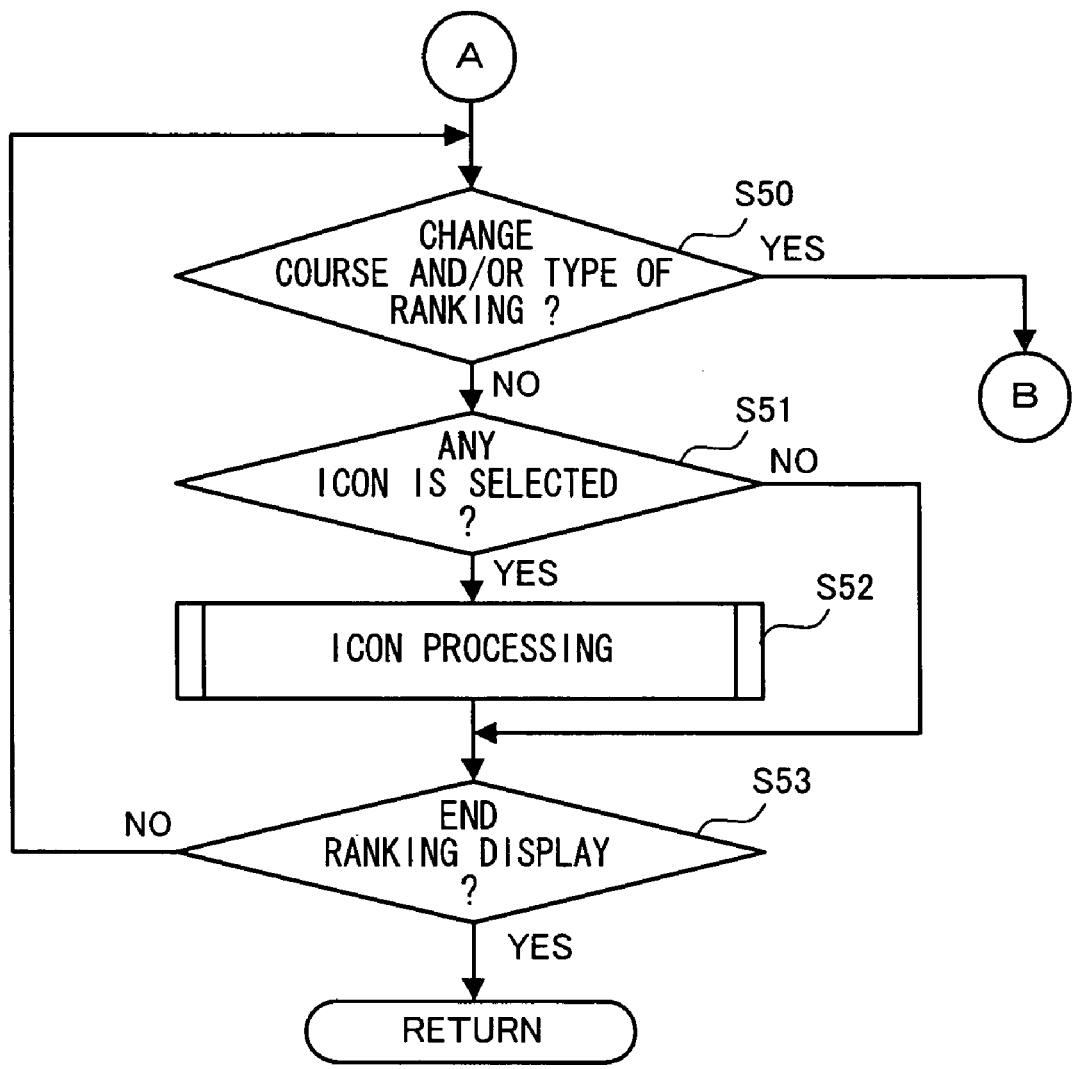
FIG. 19 shows another part of the flow chart illustrating in detail the ranking display process.

Following step S41, the process advances to step S50 shown in FIG. 19.

In step S50, the CPU 10 determines whether or not the racecourse or the type of the ranking for which the ranking is to be displayed is changed, in accordance with an instruction inputted by a user using the controller 7. Specifically, the CPU 10 determines whether or not a user selects any of button images Bt1, Bt2, Bt3, Bt4, and Bt5 (that is, whether or not the A button 72d is pressed while a pointer P is put on any of the button images) When the racecourse or the type of the ranking for which the ranking is to be displayed is changed, the process is returned to step S30 shown in FIG. 18. Otherwise, the process advances to step S51. When the racecourse or the type of the ranking is changed, the distribution chart depending on the racecourse or the type of the ranking having been changed is displayed by performing subsequent processing. For example, the distribution chart shown in FIG. 23 indicates the ranking in the world for the second course, whereas the distribution chart shown in FIG. 24 indicates the ranking in Japan for the eighth course.

In step S51, the CPU 10 determines whether or not a one of the icons is selected in accordance with an instruction inputted by a user using the controller 7. Specifically, the CPU 10 determines whether or not a user selects a one of the icons (the icon Icw representing the world champion, the icon Ic1 representing the first player, the icon Ic2 representing the second player, and the icon Icf representing a friend, in an example shown in FIG. 23) displayed on the screen (that is, whether or not the A button 72d is pressed while the pointer P is put on the one of the icons). When a one of the icons is selected, the process advances to step S52. Otherwise, the process advances to step S53.

In step S52, the CPU 10 performs icon processing. The icon processing is performed in accordance with the icon selected by a user. The icon processing will be described below in detail.

In step S53, the CPU 10 determines whether or not the display of the ranking is to be ended, in accordance with an instruction inputted by a user using the controller 7. When the display of the ranking is to be continued, the process is returned to step S50. When the display of the ranking is to be ended, the ranking display process (S21) is ended, and the process advances to step S22 shown in FIG. 17.

Figure 20:
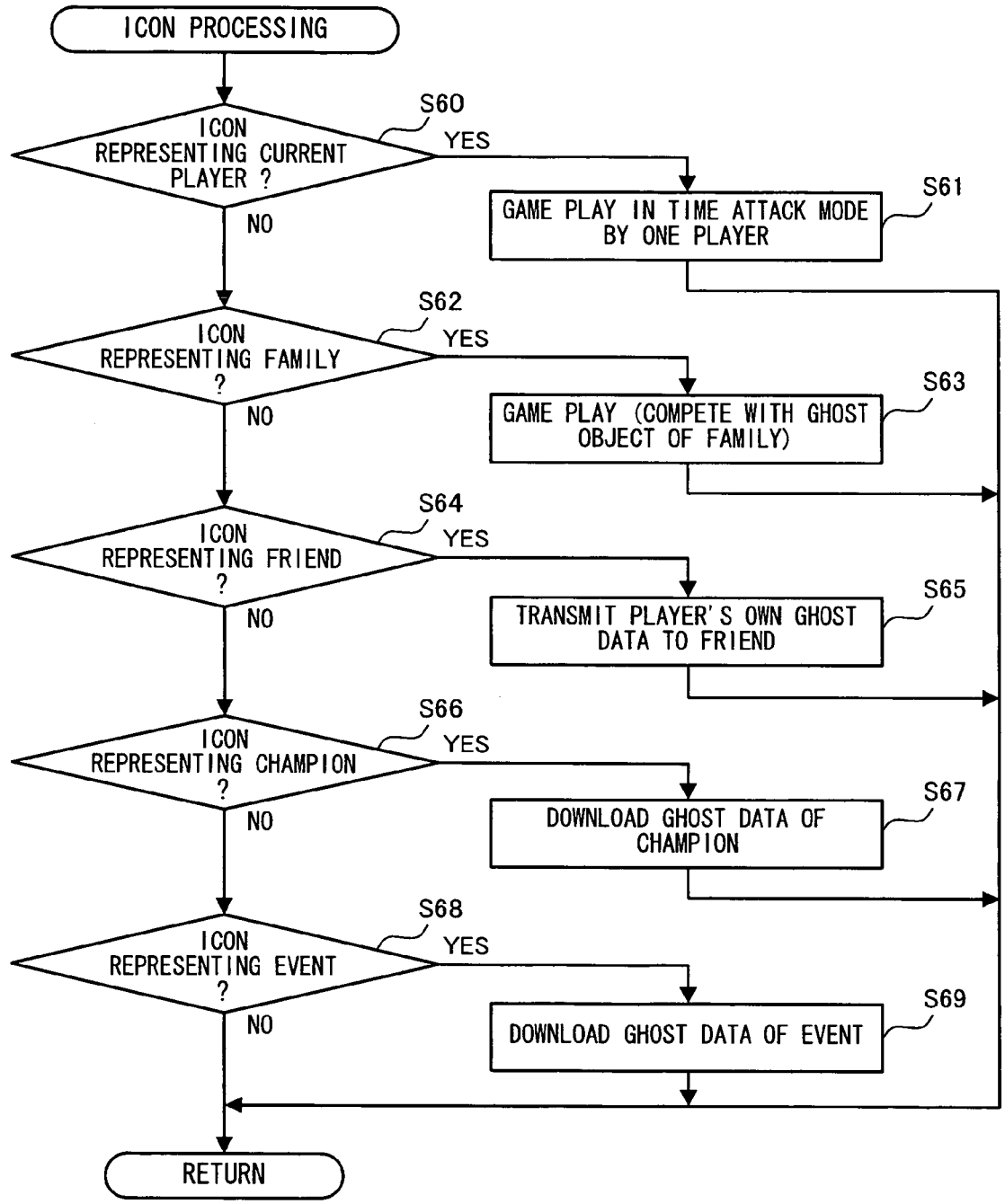
FIG. 20 is a flow chart illustrating in detail icon processing.

Next, the icon processing will be described in detail with reference to a flow chart shown in FIG. 20.

In step S60, the CPU 10 determines whether or not the icon selected in step S51 is an icon (the icon Ic1 representing a first player shown in FIG. 23) representing a current player (provisionally representing the first player). When the icon selected in step S51 is the icon representing the current player, the process advances to step S61. Otherwise, the process advances to step S62.

In step S61, the CPU 10 executes game processing in the time attack mode in which only the player object Op runs the racecourse as a process associated with the icon representing the current player selected by a user. Thereafter, the icon processing is ended and the process advances to step S53 shown in FIG. 19.

In step S62, the CPU 10 determines whether or not the icon selected in step S51 is an icon (the icon Ic2 representing the second player shown in FIG. 23) representing a family (more generally, a player, other than the current player, using the same game apparatus 3, and provisionally representing the second player) When the icon selected in step S51 is the icon representing the family, the process advances to step S63. Otherwise, the process advances to step S64.

In step S63, the CPU 10 executes, as a process associated with the icon which is selected by a user and represents the family, game processing in competing-with-ghost mode in which the player object Op competes with the ghost object Og controlled in accordance with the ghost data of a player represented by the icon representing the family. Thereafter, the icon processing is ended, and the process advances to step S53 shown in FIG. 19.

In step S64, the CPU 10 determines whether or not the icon selected in step S51 is an icon representing a friend (the icon Icf representing a friend shown in FIG. 23). When the icon selected in step S51 is an icon representing a friend, the process advances to step S65. Otherwise, the process advances to step S66.

In step S65, the CPU 10 executes, as a process associated with the icon which is selected by a user and represents the friend, a process of transmitting the ghost data of the current player, which is stored in the own ghost data storage area of the flash memory 17, to the game apparatus 3 of the friend represented by the icon. Thereafter, the icon processing is ended, and the process advances to step S53 shown in FIG. 19.

In step S66, the CPU 10 determines whether or not the icon selected in step S51 is an icon representing a champion (the icon Icw representing a world champion shown in FIG. 23). When the icon selected in step S51 is an icon representing a champion, the process advances to step S67. Otherwise, the process advances to step S68.

In step S67, the CPU 10 executes, as a process associated with an icon which is selected by a user and represents a champion, a process of requesting, from the server device 8, the ghost data of the champion represented by the icon so as to download the ghost data from the server device 8. Thereafter, the icon processing is ended, and the process advances to step S53 shown in FIG. 19. When the ghost data requested from the server device 8 is the ghost data of a local champion, the CPU 10 transmits, to the server device 8, a request signal for requesting the ghost data and simultaneously notifies the server device 8 of the residence area.

In a case where the ghost data is downloaded in step S67, when the number of users for which the ghost data are stored as the received ghost data in the received ghost data storage area of the flash memory 17 is 32, which is the storage allowable maximum number, the received ghost data for one user is deleted in accordance with an instruction from a user, and thereafter the ghost data downloaded in step S67 is newly stored. After the ghost data is downloaded from the server device 8, the CPU 10 may automatically start the game processing in the competing-with-ghost mode in which the ghost data is used.

In step S68, the CPU 10 determines whether or not the icon selected in step S51 is an icon representing an event. When the icon selected in step S51 is an icon representing an event, the process advances to step S69. Otherwise, the icon processing is ended, and the process advances to step S53 shown in FIG. 19.

In step S69, the CPU 10 executes, as a process associated with the icon which is selected by a user and represents the event, a process of downloading, from the server device 8, the ghost data for the event represented by the icon. Thereafter, the icon processing is ended, and the process advances to step S53 shown in FIG. 19.

Figure 25:
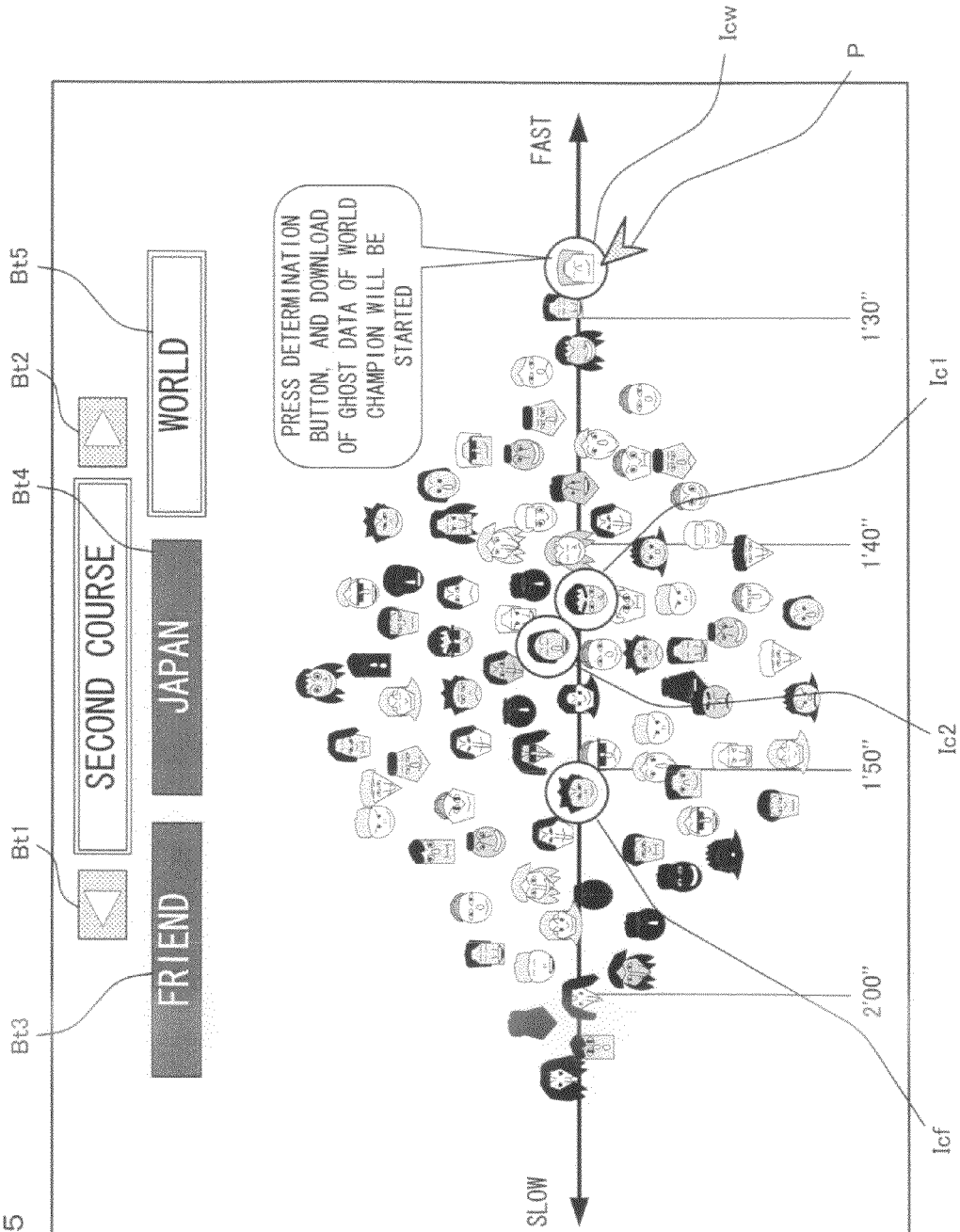
FIG. 25 is a diagram illustrating still another exemplary distribution chart displayed on the screen of the television set 2.

As described above, a process associated with an icon selected by a user is performed as the icon processing. In order to allow a user to easily know, for each icon, a process associated with the icon, when the pointer P is put on a one of the icons, a speech balloon for notifying the user of a process to be executed by selecting the one of the icons (that is, by pressing the A button 72d while putting the pointer P on the one of the icons) may be displayed as shown in, for example, FIG. 25. Alternatively, when the A button 72d is once pressed while the pointer P is put on a one of the icons, the speech balloon described above is displayed, and when the A button 72d is pressed again while the speech balloon is displayed, the process associated with the icon may be executed.

The ghost data may be downloaded from the server device 8 when, for example, the execution of the racing game program is started, in addition to when an instruction is inputted by a user. Further, the ghost data may be periodically (for example, once a day) downloaded from the server device 8 by using constant connection allowing communication as described above.

In the present embodiment, the type of the ghost data requested from the server device 8 by the game apparatus 3 represents only the ghost data of champions or the ghost data for an event. However, the present invention is not limited thereto. For example, the game apparatus 3 may request and download, from the server device 8, the ghost data including the accomplishment time near that of the user's own best record (that is, the ghost data including the accomplishment time which is almost the same as that of the user's own best record, or the ghost data including the accomplishment time which is slightly better than that of the user's own best record).

Figure 26:
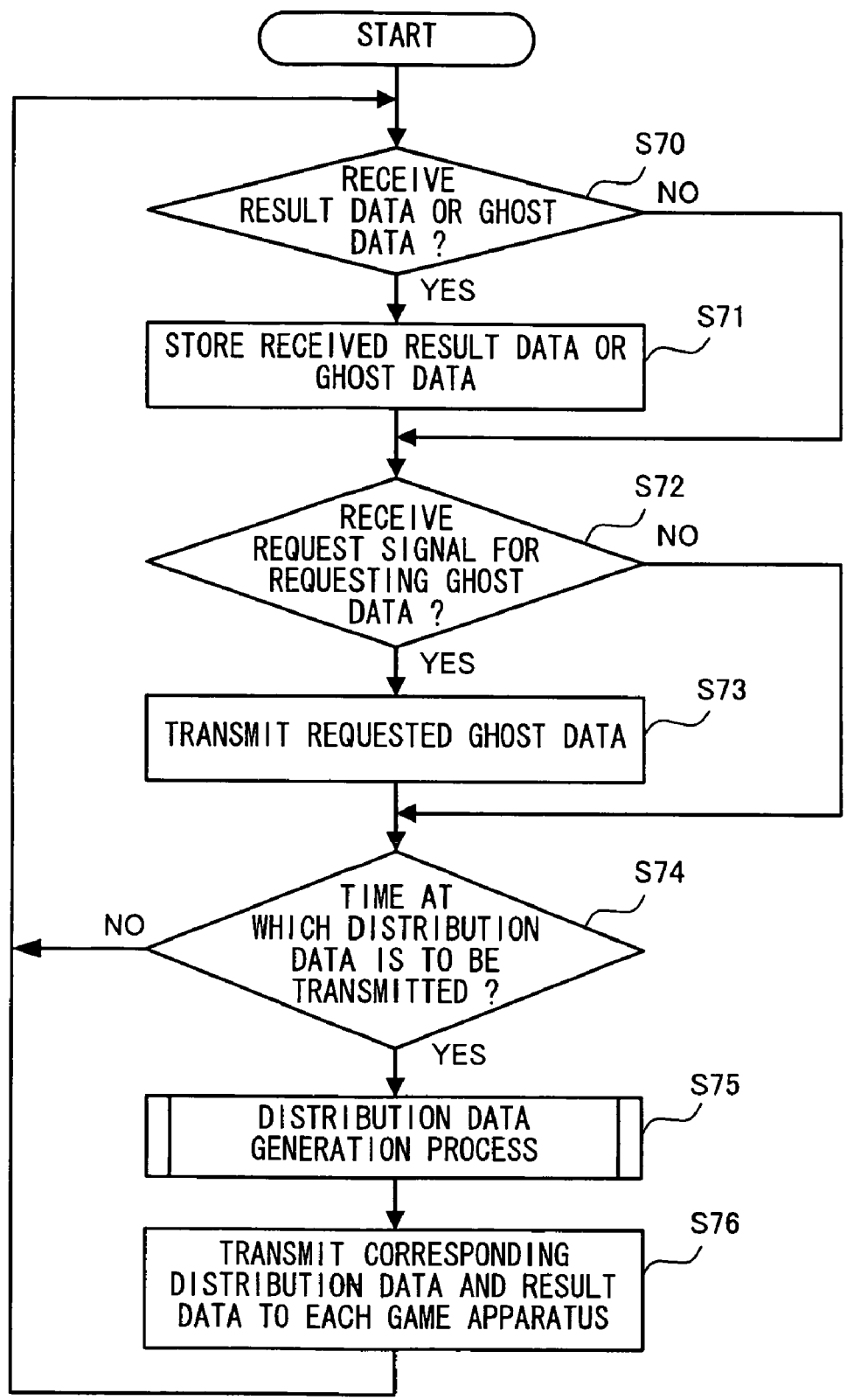
FIG. 26 is a flow chart illustrating a flow of process performed by the CPU 81 of the server device 8.

Next, an operation performed by the CPU 81 of the server device 8 will be described with reference to a flow chart shown in FIG. 26. The flow chart shows a flow of a process performed by the CPU 81 based on the computer program stored in the HDD 83.

When the execution of the computer program is started, the CPU 81 determines, in step S70, whether or not the result data (as shown in FIG. 12) or the ghost data (as shown in FIG. 13) is received from the game apparatus 3. When the result data or the ghost data is received, the process advances to step S71. Otherwise, the process advances to step S72.

In step S71, the CPU 81 stores the received result data or ghost data in the HDD 83. At this time, the CPU 81 updates, as necessary, the result data or the ghost data, stored in the HDD 83, of the world champion and/or the local champion.

In step S72, the CPU 81 determines whether or not a download request signal for requesting download of the ghost data is received from the game apparatus 3. When the download request signal is received, the process advances to step S73. Otherwise, the process advances to step S74.

In step S73, the CPU 81 transmits, to the game apparatus 3, the ghost data corresponding to the download request signal received in step S72, among the ghost data stored in the HDD 83.

In step S74, the CPU 81 determines whether or not a time (hereinafter, referred to as a distribution data transmission time) at which the distribution data is to be transmitted to the game apparatus 3 has come. When the distribution data transmission time has come, the process advances to step S75. Otherwise, the process is returned to step S70. In the present embodiment, the distribution data is periodically (for example, once a day) transmitted from the server device 8 to the game apparatus 3 at a predetermined time by using the constant connection allowing communication as described above. Instead thereof, the server device 8 may transmit the distribution data to the game apparatus 3 each time a request is issued by the game apparatus 3.

In step S75, the CPU 81 performs the distribution data generation process. The distribution data generation process is a process of generating the distribution data in accordance with the game apparatus 3 to which the distribution data is to be transmitted. The distribution data generation process will be described below in detail.

In step S76, the CPU 81 transmits, to each of the game apparatuses 3, the corresponding distribution data (that is, the world distribution data and the local distribution data corresponding to a place in which the game apparatus 3 is set), and the corresponding result data (that is, the world champion result data, and the result data of the local champion corresponding to a place in which the game apparatus 3 is set, and the event result data). Thereafter, the process is returned to step S70.

Figure 27:
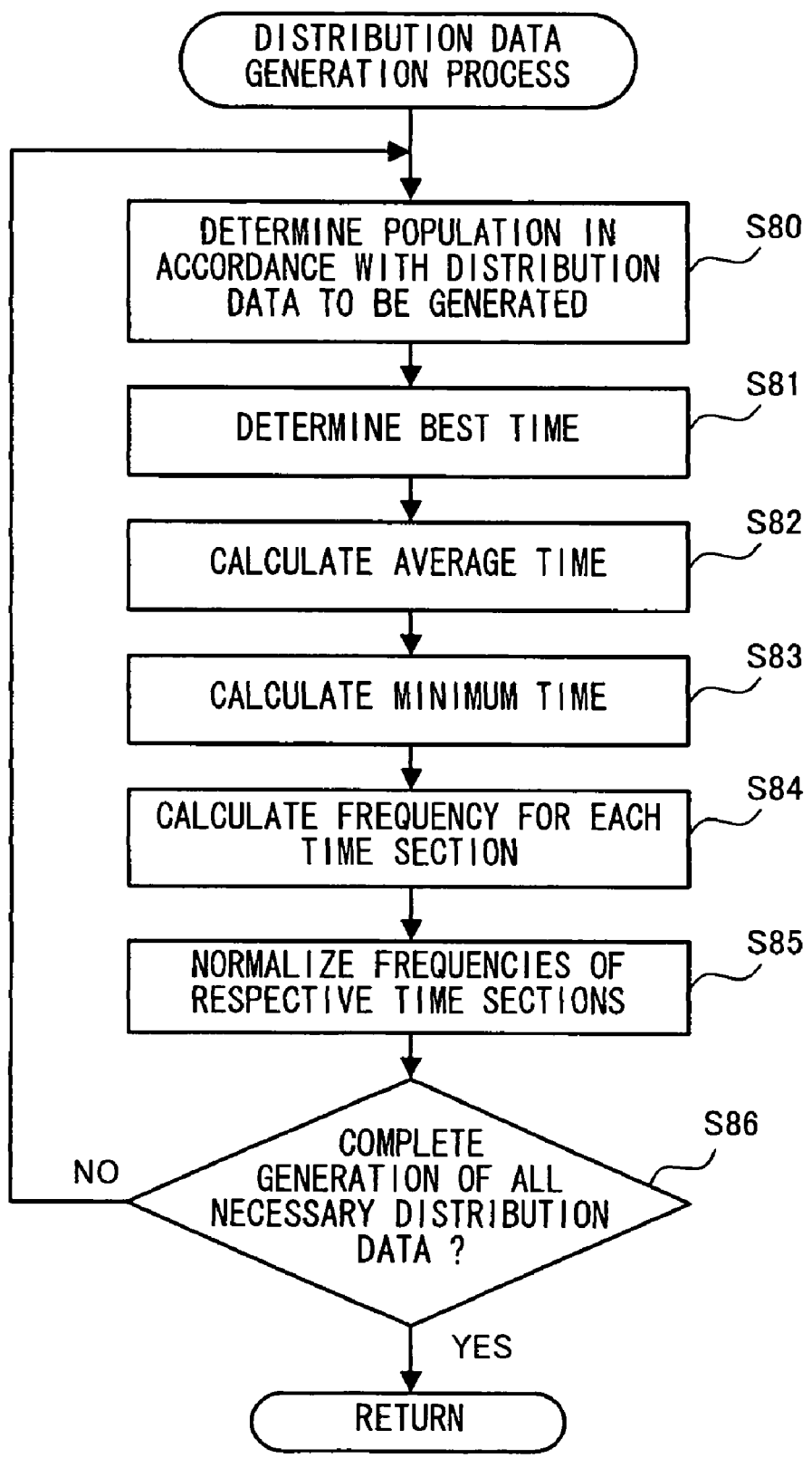
FIG. 27 is a flow chart illustrating in detail distribution data generation process.

Next, the distribution data generation process will be described in detail with reference to a flow chart of FIG. 27.

In step S80, the CPU 81 determines a population depending on the distribution data to be generated, by using the result data stored in the result data database of the HDD 83. Specifically, when the world distribution data is to be generated, the population is determined so as to include therein all the result data stored in the result data database. When the local distribution data is to be generated, the population is determined for each residence area. For example, when the distribution data for Japan is to be generated, the population is determined so as to include therein all the result data in which the residence area represents 'Japan'.

In step S81, the CPU 81 determines the best time based on the accomplishment times of the result data which are determined, in step S80, as being included in the population.

In step S82, the CPU 81 calculates an average time of the accomplishment times of the result data which is determined, in step S80, as being included in the population.

In step S83, the CPU 81 calculates the minimum time based on the best time determined in step S81 and the average time calculated in step S82. The minimum time is calculated in the manner described above.

In step S84, the CPU 81 calculates the frequency for each time section. Specifically, the CPU 81 calculates, for each time section, the number of users for which the accomplishment times of the result data belong to said each time section, among the result data determined as being included in the population in step S80. For example, when the range of the time section [n] is a range from the accomplishment time Tn0 to the accomplishment time Tn1 (Tn0<Tn1), the number of users having the result data including the accomplishment times which are greater than or equal to Tn0 and smaller than Tn1 is calculated as the frequency for the time section[n], among the result data determined as being included in the population in step S80. The method for setting each time section is described above.

In step S85, the CPU 81 normalizes the frequencies for the respective time sections such that the maximum value of the frequency is 255. For example, when the greatest value of all values represented by the frequencies, calculated in step S84, for all the time sections is 1000, the frequencies for the respective time sections are normalized by multiplying, by 255/1000=0.25, the frequencies calculated in step S84 for the respective time sections. This normalization enables the frequency of each time section to be always represented as digital data of 8 bits. Thus, the data size of the distribution data to be transmitted from the server device 8 to each of the game apparatuses 3 is prevented from being substantially increased due to the population being enormous, thereby stably transmitting the distribution data. The normalization method is not limited to the aforementioned method. When step S85 is unnecessary, step S85 may be skipped.

In step S86, the CPU 81 determines whether or not generation of all necessary distribution data has been completed. When the generation of all necessary distribution data has been completed, the distribution data generation process is ended, and the process advances to step S76 shown in FIG. 26. Otherwise, the process is returned to step S80, and the distribution data for another population, which has not been generated yet, is generated.

As described above, according to the present embodiment, the distribution chart for indicating the distribution of the result data is displayed as shown in FIG. 23, and therefore a user is allowed to easily know the rank of the user's own result in the population.

An icon displayed, on the distribution chart, for identifying each result data represents a position of each result data. In addition thereto, the icon allows a user to input, by selecting the icon, an instruction for executing the process associated with the result data represented by the icon. Therefore, not only information is provided but also an interactive operation using the distribution chart can be realized. In an exemplary application, a user is allowed to intuitively input, by using the distribution chart, an instruction for downloading the ghost data of another user having the result which is slightly better than that of the user, or downloading the ghost data of another user having a result representing an average performance.

Further, a user is allowed to input an instruction for executing the process associated with the result data represented by an icon while the distribution chart is displayed, and therefore a time and effort from confirmation of the distribution chart to the instruction for executing the process associated with the desired result data can be minimized, thereby enhancing operability.

Further, instead of icons representing all the result data being displayed as the elements of the distribution chart on the distribution chart, a portion of the result data are represented as the dummy icons. Therefore, even when the number of elements of the distribution chart is enormous, preferable visibility of the distribution chart can be secured.

In the present embodiment, on the distribution chart, not only the result data generated by the game apparatus 3 of a user thereof but also the result data generated by another game apparatus 3 are displayed as elements. However, the present invention is not limited thereto. Only the result data generated by the game apparatus 3 of the user thereof may be used so as to display the distribution chart.

In the present embodiment, the distribution chart is displayed based on the accomplishment times of the racing game. However, in general, the distribution chart maybe displayed based on game scores representing skills obtained by playing a game. Furthermore, the distribution chart may be generated based on any index (for example, an index indicating a skill represented by a content of an operation performed by a user) by using as elements any data other than the data associated with the game.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium for storing a distribution chart display program executed by a computer of an information processing apparatus for displaying, as elements of a distribution chart, a plurality of pieces of data each including a predetermined index, on the distribution chart of a predetermined scale, the distribution chart display program causing the computer to execute:
    calculating position coordinate points for the plurality of pieces of data on the distribution chart, by using the predetermined scale and values represented by the predetermined index included in each of the plurality of pieces of data;
    displaying, at the calculated position coordinate points, identification images, respectively, for enabling identification of each of the plurality of pieces of data;
    selecting, in accordance with an input from an input device, one of the displayed identification images; and
    executing a process associated with a portion of the plurality of pieces of data, the portion of the plurality of pieces of data being represented by the one of the selected identification images,
    wherein in addition to the identification images, a plurality of dummy identification images schematically representing a distribution of the elements on the distribution chart in accordance with distribution data representing the distribution is displayed.

2. The non-transitory computer-readable storage medium according to claim 1, wherein the plurality of pieces of data are each result data representing a play result of a predetermined game in units of users, and the predetermined index is a game score representing a rank indicated by the play result of the predetermined game.

3. The non-transitory computer-readable storage medium according to claim 2, wherein the result data represents the play result of a racing game, and the game score is an accomplishment time for the racing game.

4. The non-transitory computer-readable storage medium according to claim 2, wherein, when the one of the identification images selected represents the result data of a user operating the input device, a process of causing the user to play again a game associated with the result data is executed.

5. The non-transitory computer-readable storage medium according to claim 2, wherein, when the one of the identification images selected represents the result data of a user, other than a user operating the input device, among users of the information processing apparatus, a process of causing the user operating the input device to compete with the user associated with the one of the identification images having been selected is executed, by using play data representing an operation content obtained when the user associated with the one of the identification images having been selected has performed, in the predetermined game, a play represented by the result data.

6. The non-transitory computer-readable storage medium according to claim 2, wherein, when the one of the identification images selected represents the result data generated by another information processing apparatus, a process of transmitting, to the another information processing apparatus, play data representing an operation content obtained when a user operating the input device previously played the predetermined game is executed.

7. The non-transitory computer-readable storage medium according to claim 2, wherein, when the one of the identification images selected represents the result data generated by another information processing apparatus, a process of downloading play data representing an operation content of a user of the another information processing apparatus is executed, the operation content being obtained when the result data is generated, from the information processing apparatus storing the play data.

8. The non-transitory computer-readable storage medium according to claim 7, wherein after the play data is downloaded from the information processing apparatus storing the play data, a process of causing a user operating the input device to compete is executed, by using the downloaded play data, with the user corresponding to the downloaded play data.

9. The non-transitory computer-readable storage medium according to claim 1, wherein the predetermined index indicates skills represented by operation contents, of users, obtained when the plurality of pieces of data are generated.

10. The non-transitory computer-readable storage medium according to claim 1, wherein a process of causing the information processing apparatus to reproduce, by using operation information representing a content of an input operation which has been previously performed by a user and is represented by the one of the selected identification images, the input operation of the user is executed.

11. The non-transitory computer-readable storage medium according to claim 1, wherein the distribution chart display program causes the computer to further execute:
determining the total number of the plurality of dummy identification images to be displayed, in accordance with a type of the distribution chart and/or the total number of the plurality of pieces of data corresponding to the elements of the distribution chart.

12. The non-transitory computer-readable storage medium according to claim 1, wherein the distribution chart display program causes the computer to further execute:
determining, in units of time sections into which the values represented by the predetermined index are classified, the number of the plurality of dummy identification images to be displayed, by using the distribution data.

13. The non-transitory computer-readable storage medium according to claim 12, wherein the distribution chart display program causes the computer to further execute:
determining, for each time section, a display range in which the plurality of dummy identification images are displayed, in accordance with the determined number of the plurality of dummy identification images to be displayed for each time section.

14. The non-transitory computer-readable storage medium according to claim 13, wherein the distribution chart display program causes the computer to further execute:
determining at random display positions at which the determined number of the plurality of dummy identification images are displayed within the determined display range.

15. The non-transitory computer-readable storage medium according to claim 1, wherein the distribution chart display program causes the computer to further execute:
automatically generating at random the plurality of dummy identification images.

16. The non-transitory computer readable storage medium according to claim 1, wherein the number of dummy icons to be displayed is determined by multiplying a total number of dummy icons to be displayed by a frequency in a section of time and then divided by the frequencies of all sections of time.

17. The non-transitory computer readable storage medium according to claim 1, wherein the identification images each represent a unique image.

18. The non-transitory computer-readable storage medium according to claim 1, wherein the identification images represent a face of a user.

19. The non-transitory computer readable storage medium according to claim 18, wherein in addition to the identification images, dummy identification images representing faces are randomly generated and displayed.

20. The non-transitory computer readable storage medium according to claim 1, wherein the identification images are images which can be selected by a user, and the dummy identification images are images which cannot be selected by the user.

21. The non-transitory computer-readable storage medium according to claim 1, wherein the identification images are highlighted when displayed so as to be distinguished from the dummy identification images.

22. The non-transitory computer readable storage medium according to claim 1, wherein the distribution chart display program further causing the computer to execute determining the predetermined scale in accordance with at least one of, a maximum value among, a minimum value among, and an average value of, the values represented by the predetermined index included in each of the plurality of pieces of data corresponding to the elements of the distribution chart.

23. An information processing apparatus for displaying, as elements of a distribution chart, a plurality of pieces of data each including a predetermined index, on the distribution chart of a predetermined scale, the information processing apparatus comprising:
a position coordinate point calculation unit for calculating position coordinate points for the plurality of pieces of data on the distribution chart, by using the predetermined scale and values represented by the predetermined index included in each of the plurality of pieces of data;
an identification image display unit for displaying, at the position coordinate points calculated by the position coordinate point calculation unit, identification images, respectively, for enabling identification of each of the plurality of pieces of data;
an identification image selection unit for selecting, in accordance with an input from an input device, one of the identification images displayed by the identification image display unit; and
an associated process execution unit for executing a process associated with a portion of the plurality of pieces of data, the portion of the plurality of pieces of data being represented by the one of the identification images selected by the identification image selection unit,
wherein in addition to the identification images, a plurality of dummy identification images schematically representing a distribution of the elements on the distribution chart in accordance with distribution data representing the distribution is displayed.

24. The information processing apparatus according to claim 23, wherein in addition to the identification images, a plurality of dummy identification images schematically representing a distribution of the elements on the distribution chart in accordance with distribution data representing the distribution is displayed, and the number of dummy icons to be displayed is determined by multiplying a total number of dummy icons to be displayed by a frequency in a section of time and then divided by the frequencies of all sections of time.

25. The information processing apparatus according to claim 23, wherein the identification images each represent a unique image.

26. The information processing apparatus according to claim 23, wherein the identification images represent a face of a user.

27. The information processing apparatus according to claim 26, wherein in addition to the identification images, dummy identification images representing faces are randomly generated and displayed.

28. The information processing apparatus according to claim 23, wherein the identification images are images which can be selected by a user, and the dummy identification images are images which cannot be selected by the user.

29. The information processing apparatus according to claim 23, wherein the identification images are highlighted when displayed so as to be distinguished from the dummy identification images.

30. The information processing apparatus according to claim 23, wherein the predetermined scale is determined in accordance with at least one of, a maximum value among, a minimum value among, and an average value of, the values represented by the predetermined index included in each of the plurality of pieces of data corresponding to the elements of the distribution chart.

31. A distribution chart display system comprising:
a plurality of information processing apparatuses each of which displays, on a distribution chart of a predetermined scale, a plurality of pieces of data, each including a predetermined index, which are generated by the plurality of information processing apparatuses, as elements of the distribution chart; and
a data management apparatus for collecting, from the plurality of information processing apparatuses, the plurality of pieces of data each including the predetermined index, the data management apparatus having:
a reception unit for receiving, from the plurality of information processing apparatuses, the plurality of pieces of data each including the predetermined index;
a distribution data generation unit for generating distribution data representing a distribution of the elements of the distribution chart, in accordance with the plurality of pieces of data received by the reception unit; and
a transmission unit for transmitting the distribution data to the plurality of information processing apparatuses, and
wherein each information processing apparatus having:
a position coordinate point calculation unit for calculating position coordinate points for the plurality of pieces of data on the distribution chart, by using the predetermined scale and values represented by the predetermined index included in each of the plurality of pieces of data stored in said each information processing apparatus;
an identification image display unit for displaying, at the position coordinate points calculated by the position coordinate point calculation unit, identification images, respectively, for enabling identification of each of the plurality of pieces of data stored in said each information processing apparatus, and displaying, in accordance with the distribution data received from the data management apparatus, a plurality of dummy identification images schematically representing the distribution of the plurality of pieces of data generated by the plurality of information processing apparatuses;
an identification image selection unit for selecting, in accordance with an input from an input device, one of the identification images displayed by the identification image display unit; and
an associated process execution unit for executing a process associated with a portion of the plurality of pieces of data, the portion of the plurality of pieces of data being represented by the one of the identification images selected by the identification image selection unit,
wherein in addition to the identification images, a plurality of dummy identification images schematically representing a distribution of the elements on the distribution chart in accordance with distribution data representing the distribution is displayed.

32. The distribution chart display system according to claim 31, wherein in addition to the identification images, a plurality of dummy identification images schematically representing a distribution of the elements on the distribution chart in accordance with distribution data representing the distribution is displayed, and the number of dummy icons to be displayed is determined by multiplying a total number of dummy icons to be displayed by a frequency in a section of time and then divided by the frequencies of all sections of time.

33. The distribution chart display system according to claim 31, wherein the identification images each represent a unique image.

34. The distribution chart display system according to claim 31, wherein the identification images represent a face of a user.

35. The distribution chart display system according to claim 34, wherein in addition to the identification images, dummy identification images representing faces are randomly generated and displayed.

36. The distribution chart display system according to claim 31, wherein the identification images are images which can be selected by a user, and the dummy identification images are images which cannot be selected by the user.

37. The distribution chart display system according to claim 31, wherein the identification images are highlighted when displayed so as to be distinguished from the dummy identification images.

38. The distribution chart display system according to claim 31, wherein the predetermined scale is determined in accordance with at least one of, a maximum value among, a minimum value among, and an average value of, the values represented by the predetermined index included in each of the plurality of pieces of data corresponding to the elements of the distribution chart.

39. A method of displaying on a display device, as elements of a distribution chart, a plurality of pieces of data each including a predetermined index, on the distribution chart of a predetermined scale, the method comprising:
calculating position coordinate points for the plurality of pieces of data on the distribution chart, by using the predetermined scale and values represented by the predetermined index included in each of the plurality of pieces of data;

displaying, at the calculated position coordinate points, identification images, respectively, for enabling identification of each of the plurality of pieces of data;

selecting, in accordance with an input from an input device, one of the displayed identification images; and executing a process associated with a portion of the plurality of pieces of data, the portion of the plurality of pieces of data being represented by the one of the selected identification images, wherein in addition to the identification images, a plurality of dummy identification images schematically representing a distribution of the elements on the distribution chart in accordance with distribution data representing the distribution is displayed.

40. The method according to claim 39, wherein in addition to the identification images, a plurality of dummy identification images schematically representing a distribution of the elements on the distribution chart in accordance with distribution data representing the distribution is displayed, and the number of dummy icons to be displayed is determined by multiplying a total number of dummy icons to be displayed by a frequency in a section of time and then divided by the frequencies of all sections of time.

41. The method according to claim 39, wherein the identification images each represent a unique image.

42. The method according to claim 39, wherein the identification images represent a face of a user.

43. The method according to claim 42, wherein in addition to the identification images, dummy identification images representing faces are randomly generated and displayed.

44. The method according to claim 39, wherein the identification images are images which can be selected by a user, and the dummy identification images are images which cannot be selected by the user.

45. The method according to claim 39, wherein the identification images are highlighted when displayed so as to be distinguished from the dummy identification images.

46. The method according to claim 39, further comprising determining the predetermined scale in accordance with at least one of, a maximum value among, a minimum value among, and an average value of, the values represented by the predetermined index included in each of the plurality of pieces of data corresponding to the elements of the distribution chart.

* * * * *